US012113993B2

(12) United States Patent
Tang et al.

(10) Patent No.: US 12,113,993 B2
(45) Date of Patent: Oct. 8, 2024

(54) VIDEO PROCESSING METHOD AND DEVICE

(71) Applicant: SHANGHAI BILIBILI TECHNOLOGY CO., LTD., Shanghai (CN)

(72) Inventors: Ran Tang, Shanghai (CN); Yi Wang, Shanghai (CN); Long Zheng, Shanghai (CN); Jun He, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/547,165

(22) Filed: Dec. 9, 2021

(65) Prior Publication Data

US 2022/0191522 A1 Jun. 16, 2022

(30) Foreign Application Priority Data

Dec. 11, 2020 (CN) .......................... 202011441087.8
Dec. 11, 2020 (CN) .......................... 202011442524.8
Dec. 11, 2020 (CN) .......................... 202011450293.5

(51) Int. Cl.
*H04N 19/40* (2014.01)
*H04N 19/89* (2014.01)

(52) U.S. Cl.
CPC .............. *H04N 19/40* (2014.11); *H04N 19/89* (2014.11)

(58) Field of Classification Search
CPC ......... H04N 19/40; H04N 19/89; H04N 19/46
See application file for complete search history.

(56) References Cited

U.S. PATENT DOCUMENTS

| 9,986,288 | B2* | 5/2018 | Besehanic | .......... H04N 21/4223 |
| 2008/0120676 | A1* | 5/2008 | Morad | ............. H04N 21/42607 375/E7.076 |
| 2011/0060792 | A1* | 3/2011 | Ebersviller | ............ H04N 19/40 709/231 |
| 2013/0148741 | A1* | 6/2013 | Steinberg | ............... H04N 19/59 375/240.01 |
| 2017/0109858 | A1* | 4/2017 | Jiang | ..................... G06T 1/0057 |
| 2019/0066254 | A1* | 2/2019 | Tung | ..................... H04N 1/387 |
| 2019/0180454 | A1* | 6/2019 | Choudhury | .......... H04N 19/139 |

FOREIGN PATENT DOCUMENTS

| CN | 105263024 A | 1/2016 |
| CN | 110049313 A | 7/2019 |

* cited by examiner

*Primary Examiner* — Tracy Y. Li
(74) *Attorney, Agent, or Firm* — BakerHostetler

(57) ABSTRACT

The present disclosure describes techniques of processing video. The techniques comprise obtaining a video to be transcoded, the video comprising a plurality of frames; setting a test object in each of the plurality of frames of the video to be transcoded; transcoding the video using a predetermined video transcoding mechanism and obtaining the transcoded video; extracting a test object from each of a plurality of frames of the transcoded video; and determining a transcoding result based at least in part on the test object extracted from each of the plurality of frames of the transcoded video.

17 Claims, 9 Drawing Sheets

Initial video

VIDEO PROCESSING METHOD AND DEVICE

CROSS REFERENCE TO RELATED APPLICATION

The present application claims the priority to Chinese Patent Application Nos. 202011441087.8, 202011442524.8, and 202011450293.5, titled "VIDEO PROCESSING METHOD AND DEVICE", filed on Dec. 11, 2020 with the Chinese Patent Office, which are incorporated herein by reference in their entireties.

FIELD

The present disclosure relates to the field of computer technologies, and in particular to a video processing method, a video processing device, a computing device and a computer-readable storage medium.

BACKGROUND

At present, in the video industry, an original video of a user is generally transcoded to obtain videos of different definitions through transcoding, so that the user can selectively play and watch the video according to the definition requirements. In this case, the video transcoding requires reprocessing on the original video of the user. This is because that various problems may occur due to the compatibility of various encapsulation and encoding protocols in the transcoding process.

SUMMARY

In view of this, there are provided a video processing method, a video processing device, a computing device and a computer-readable storage medium according to embodiments of the present disclosure, to solve problems in the conventional technology that a transcoded video has frame loss, frame drop, or sound and picture non-synchronization.

According to a first aspect of the embodiments of the present disclosure, a video processing method is provided. The video processing method includes: receiving a to-be-transcoded video, and setting a test object containing a video parameter in each video frame of the to-be-transcoded video; sending the to-be-transcoded video to a predetermined video transcoding system for video transcoding, and receiving a transcoded video returned by the video transcoding system; extracting a test object in each video frame of the transcoded video, and acquiring a video parameter contained in the test object in each video frame of the transcoded video; and determining a transcoding result for the to-be-transcoded video based on the video parameter contained in the test object in each video frame of the transcoded video.

According to a second aspect of the embodiments of the present disclosure, a video processing device is provided. The video processing device includes: a video receiving module, a video transcoding module, an object extraction module and a transcoding result determination module, where the video receiving module is configured to: receive a to-be-transcoded video and set a test object containing a video parameter in each video frame of the to-be-transcoded video; the video transcoding module is configured to: send the to-be-transcoded video to a predetermined video transcoding system for video transcoding, and receive a transcoded video returned by the video transcoding system; the object extraction module is configured to: extract a test object in each video frame of the transcoded video, and acquire a video parameter contained in the test object in each video frame of the transcoded video; and the transcoding result determination module is configured to determine a transcoding result for the to-be-transcoded video based on the video parameter contained in the test object in each video frame of the transcoded video.

According to a third aspect of the embodiments of the present disclosure, a computing device is provided. The computing device includes a memory and a processor. The memory stores computer instructions executable by the processor. The processor is configured to execute the instructions to implement the steps of the video processing method.

According to a fourth aspect of the embodiments of the present disclosure, a computer-readable storage medium is provided. The computer-readable storage medium stores computer instructions that, when executed by a processor, implement the steps of the video processing method.

The video processing method provided in the present disclosure includes: receiving a to-be-transcoded video, and setting a test object containing a video parameter in each video frame of the to-be-transcoded video; sending the to-be-transcoded video to a predetermined video transcoding system for video transcoding, and receiving a transcoded video returned by the video transcoding system; extracting a test object in each video frame of the transcoded video, and acquiring a video parameter contained in the test object in each video frame of the transcoded video; and determining a transcoding result for the to-be-transcoded video based on the video parameter contained in the test object in each video frame of the transcoded video.

With the video processing method, each video frame of the to-be-transcoded video is set with a test object containing a video parameter, and the video parameter contained in the test object in each video frame before the transcoding is compared with that after the transcoding, so that it can be quickly and accurately determined whether the video after the transcoding has the problem of frame loss, frame drop, or sound and picture non-synchronization.

DETAILED DESCRIPTION OF EMBODIMENTS

Figure 1:
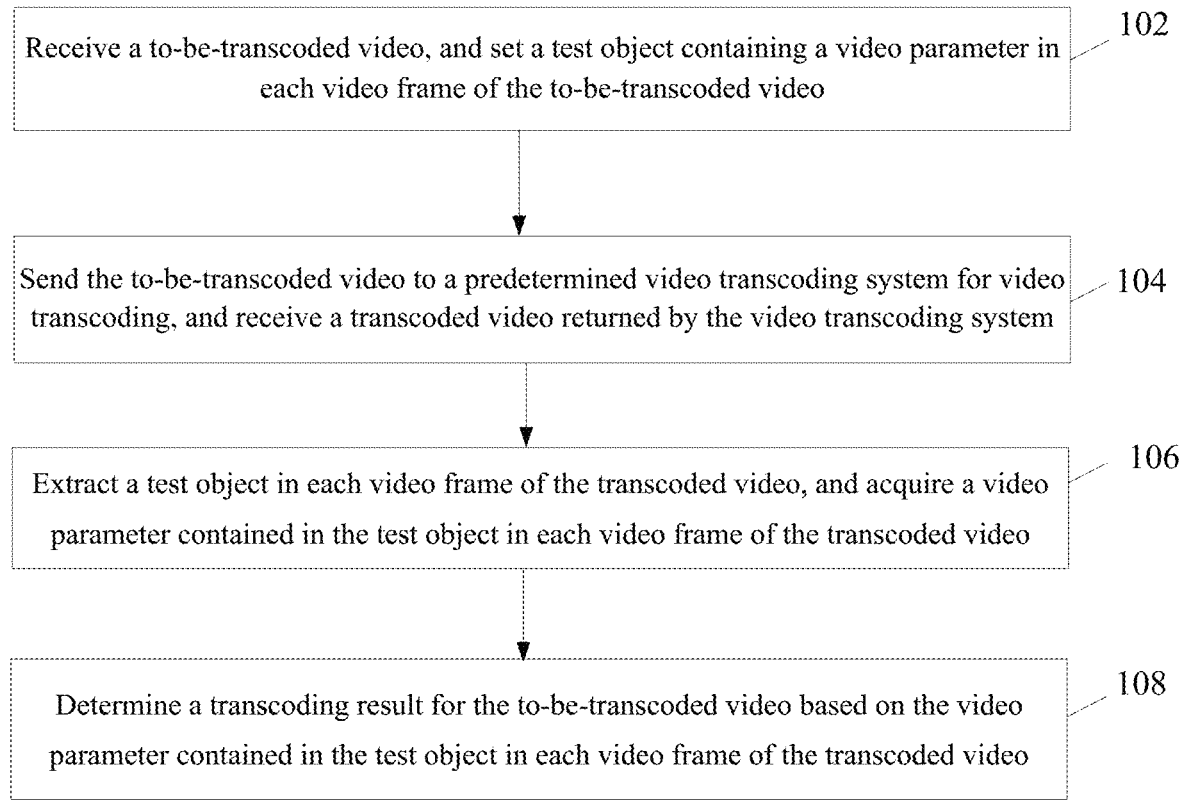
FIG. 1 is a flowchart of a video processing method according to an embodiment of the present disclosure.

In the following description, many specific details are explained in order to fully understand the present disclosure. However, the present disclosure can be implemented in many other ways different from those described herein, and those skilled in the art can make similar extensions without departing from the content of the present disclosure. Therefore, the present disclosure is not limited by specific implementations disclosed below.

The terms used in one or more embodiments of the present disclosure are only for the purpose of describing specific embodiments, and are not intended to limit the one or more embodiments of the present disclosure. In addition, the singular forms of "a", "said" and "the" used in one or more embodiments of the present disclosure and the appended claims are intended to include plural forms, unless the context clearly indicates other meanings. It should further be understood that the term "and/or" used in one or more embodiments of the present disclosure refers to and includes any or all possible combinations of one or more associated listed items.

It should be understood that, although the terms a first, second and the like may be used to describe various information in one or more embodiments of the present disclosure, the information should not be limited to these terms. These terms are only used to distinguish the same type of information from each other. For example, without departing from the scope of one or more embodiments of the present disclosure, the first may also be referred to as the second, and similarly, the second may also be referred to as the first. Depending on the context, the word "if" as used herein can be interpreted as "at a time" or "when" or "in response to a determination".

First of all, the terminologies involved in one or more embodiments of the present disclosure are explained.

Transcoding refers to a process of re-encoding audio and video.

Frame loss means that, after video transcoding, some frame-level video images are lost.

Frame drop means that, after video transcoding, some frame-level video images are lost and are supplemented by copying of adjacent frames, but the video images will not look smooth during this time period, as if they are stuck.

Video watermark refers to a process of adding some text or stickers on video images, such as a title/logo on a video.

Sound and picture non-synchronization means that, the sound of a video is inconsistent with the picture of the video, which appears as the sound lagging behind the picture, or the picture lagging behind the sound.

The Psnr is the abbreviation of Peak Signal to Noise Ratio, which is an objective standard for evaluating images, has limitations and is generally used for an engineering project between a maximum signal and a background noise.

The Ssim is the abbreviation of Structural Similarity, which is an indicator for evaluating a similarity between two images.

The Vmaf is the abbreviation of Video Multimethod Assessment Fusion.

At present, video transcoding involves reprocessing on an original video. The transcoded video may have problems such as frame loss, frame drop, or sound and picture non-synchronization, which greatly affects the video viewing experience of the user. How to preserve visual and auditory effects of the original video to the greatest extent requires a complete evaluation system to evaluate the degree of change of the video before and after transcoding. In terms of image quality evaluation in the conventional technology, there are recognized image quality evaluation systems such as the Psnr, the Ssim, and the Vmaf in the industry. These image quality evaluation systems can only visually evaluate whether there is a problem with the video before and after the transcoding, and cannot determine whether the video after the transcoding has problems such as frame loss, frame drop, or sound and picture non-synchronization.

In view of this, a video processing method is provided in the present disclosure. The present disclosure further relates to a video processing device, a computing device, and a computer-readable storage medium, which are described in detail in the following embodiments.

Reference is made to FIG. 1, which shows a flowchart of a video processing method according to an embodiment of the present disclosure. The video processing method includes the following steps 102 to 108.

In step 102, a to-be-transcoded video is received, and a test object containing a video parameter is set in each video frame of the to-be-transcoded video.

The to-be-transcoded video includes, but is not limited to, a video of any type and length, such as a short entertainment video including 30 video frames, or a long television drama video including hundreds of video frames. In practical applications, the received to-be-transcoded video may be a to-be-transcoded video including multiple video frames generated according to user requirements.

Specifically, after the to-be-transcoded video is received, a test object containing a video parameter is set in each video frame of the to-be-transcoded video The test object includes, but is not limited to, a two-dimensional code, a barcode, or an identification block of any other shape. For ease of understanding, the embodiments of the present disclosure are all described by taking the test object being a two-dimensional code as an example.

In practical applications, the video parameter includes but is not limited to a video frame serial number of the video frame where the test object is located, an audio frame quantity of an audio frame before the video frame where the test object is located, a video frame resolution of the video frame where the test object is located, and a color space of the video frame where the test object is located, a time stamp of the video frame where the test object is located, or the like. In a specific implementation, the video parameter may be extended to record some parameter information about an encapsulation layer and an encoding layer of the original video. The parameter information is not lost with the video transcoding. Through the recorded information of the encapsulation layer and the encoding layer, the video information of the to-be-transcoded video can be placed on the picture of the video frame. In a case that the video information changes after the video is transcoded, the coding layer information and the encapsulation layer information of the to-be-transcoded video are known together with the coding layer information and the encapsulation layer information of the to-be-transcoded video after the transcoding. By comparison between the to-be-transcoded video and the transcoded video in terms of the coding layer information and the encapsulation layer information, it can be determined what anomaly has occurred in the transcoding of the to-be-transcoded video and what changes have occurred in the data, providing a basis for later data statistics.

The following description is given by taking the to-be-transcoded video including three video frames: a video frame 1, a video frame 2, and a video frame 3 as an example. The video frame 1, the video frame 2, and the video frame 3 are each provided with a watermark of a two-dimensional code containing a video parameter. The watermark of each two-dimensional code carries all relevant parameters of the video frame where the two-dimensional code is located, for example, various information such as a video frame serial number of a current video frame, a times tamp of the current video frame, an audio frame quantity of an audio frame before the current video frame, and a picture resolution of the current video frame, and a color space of the current video frame.

Figure 2:
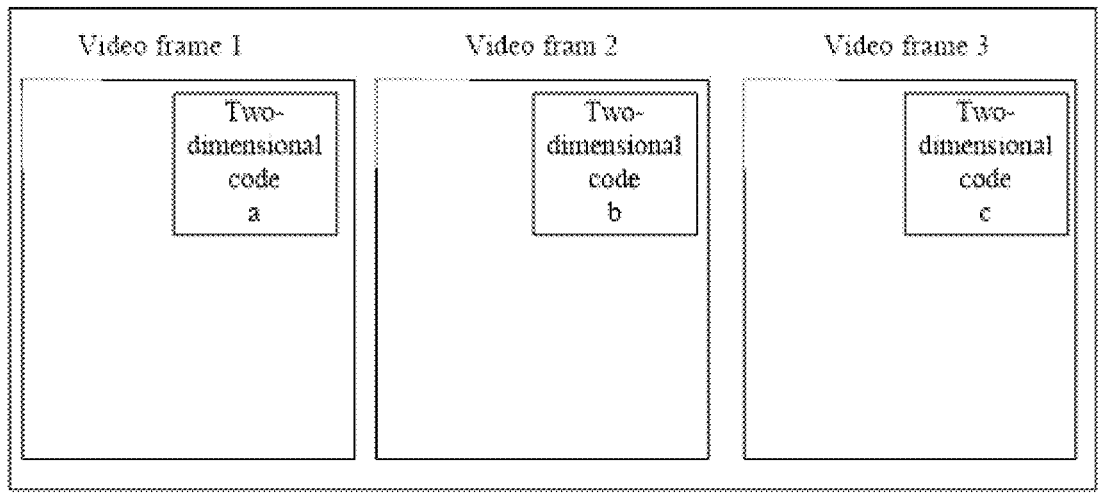
FIG. 2 is a schematic diagram showing a to-be-transcoded video in a video processing method according to an embodiment of the present disclosure.

Reference is made to FIG. 2, which shows a schematic diagram of a to-be-transcoded video in a video processing method according to an embodiment of the present disclosure.

The to-be-transcoded video in FIG. 2 includes a video frame 1, a video frame 2, and a video frame 3. A two-dimensional code a containing a video parameter is provided at the upper right corner of the video frame 1. A two-dimensional code b containing a video parameter is provided at the upper right corner of the video frame 2. A two-dimensional code c containing a video parameter is provided at the upper right corner of the video frame 3. The video parameter in the video frame 1, the video frame 2, and the video frame 3 includes a video frame serial number of a current video frame and an audio frame quantity of an audio frame before the current video frame, each of which is increased frame by frame according to an order of the video frames. For example, the video parameter contained in the two-dimensional code a of the video frame 1 includes a video frame serial number 1, and an audio frame quantity 3 before the current video frame. Further, the video parameter contained in the two-dimensional code b of the video frame 2 includes a video frame serial number 2, and an audio frame quantity 7 before the current video frame which is obtained by adding the audio frame quantity 3 before the video frame 1 to an audio frame quantity 4 between the video frame 1 and the video frame 2. Furthermore, the video parameter contained in the two-dimensional code c of the video frame 3 includes a video frame serial number 3, and an audio frame quantity 10 before the current video frame which is obtained by adding the audio frame quantity 7 before the video frame 2 to an audio frame quantity 3 between the video frame 2 and the video frame 3.

In practical applications, a test object (such as a watermark of a two-dimensional code) is set in each video frame of the to-be-transcoded video. A position of the test object in a video frame may be the same as or different from that in another video frame, which is set according to actual requirements and is not limited in the present disclosure.

In step 104, the to-be-transcoded video is sent to a predetermined video transcoding system for video transcoding, and a transcoded video returned by the video transcoding system is received.

The predetermined video transcoding system includes any video transcoding system whose transcoding quality is to be tested.

Specifically, the to-be-transcoded video is sent to a specific video transcoding system whose transcoding quality is to be tested, for video transcoding. A transcoded video that is generated after the to-be-transcoded video is transcoded and returned by the video transcoding system is received.

In step 106, a test object in each video frame of the transcoded video is extracted, and a video parameter contained in the test object in each video frame of the transcoded video is acquired.

In practical applications, each video frame of the to-be-transcoded video contains a test object, and the test object is generally not lost or garbled with the transcoding. Therefore, every video frame of the transcoded video after the transcoding includes a corresponding test object, and the test object contains a video parameter for the video frame.

Specifically, after the transcoded video is received, the test object in each video frame of the transcoded video is extracted, and the video parameter contained in the test object in each video frame of the transcoded video is acquired, such as a video frame serial number, a video frame resolution, a video frame color space, a video frame time stamp, and encapsulation layer information and of encoding layer information of the transcoded video.

In step 108, a transcoding result for the to-be-transcoded video is determined based on the video parameter contained in the test object in each video frame of the transcoded video.

Specifically, after the video parameter contained in the test object in each video frame of the transcoded video are obtained, it may be determined according to a linear increase relationship of the video parameter that is increased frame by frame, whether the to-be-transcoded video has the problem of frame loss, frame drop, or sound and picture non-synchronization during the transcoding process, and it may also be determined based on fixed parameter information in the video parameter, whether a fixed parameter in a video frame of the to-be-transcoded video before the transcoding changes in a corresponding video frame of the transcoded video after the transcoding, to determine whether the to-be-transcoded video has the problem of frame loss, frame drop, or sound and picture non-synchronization during the transcoding process, which are described in detail as follows.

The process of determining the transcoding result for the to-be-transcoded video based on the video parameter contained in the test object in each video frame of the transcoded video is performed by the following operations of:

arranging, frame by frame, the video parameter contained in the test object in each video frame of the to-be-transcoded video to form a first serial number sequence;

arranging, frame by frame, the video parameter contained in the test object in each video frame of the transcoded video to form a second serial number sequence; and comparing the first serial number sequence with the second serial number sequence, and determining that the to-be-transcoded video is successfully transcoded in a case that the first serial number sequence fully matches the second serial number sequence.

The video parameter includes, but is not limited to, the video frame serial number, the audio frame quantity, the video frame resolution, the video frame color space, the video frame times tamp, the video encapsulation information, the video encoding information, and the like.

Specifically, the video parameter contained in the test object in each video frame of the to-be-transcoded video is arranged frame by frame according to an order of all video frames in the to-be-transcoded video to form the first serial number sequence, and the video parameter contained in the test object in each video frame of the transcoded video is arranged frame by frame according to an order of all video frames in the transcoded video to form the second serial number sequence.

The first serial number sequence is compared with the second serial number sequence. If the first serial number sequence fully matches the second serial number sequence, it is determined that the to-be-transcoded video has no problem of frame loss, frame drop, or sound and picture non-synchronization during the transcoding process, indicating that the video transcoding is successful. If the first serial number sequence does not match the second serial number sequence, for example, if there are 3 video parameters in the first serial number sequence but there are 4 video parameters in the second serial number sequence, it is determined that the to-be-transcoded video may have the problem of frame drop during the transcoding process, and if there are 3 video parameters in the first serial number sequence but there are 2 video parameters in the second serial number sequence, it is determined that the to-be-transcoded video may have the problem of frame loss during the transcoding process, both indicating that the to-be-transcoded video is unsuccessfully transcoded. In this case, a wrong video frame is found based on the unmatched serial number. After analyzing the wrong video frame, the video transcoding system is restored and adjusted based on the analysis result. In addition, if a video parameter in the first serial number sequence does not match the video parameter in the second serial number sequence, it can be indicated that the to-be-transcoded video is unsuccessfully transcoded, which is described in detail as follows.

In the embodiment of the present disclosure, by comparing the video parameter contained in the test object in each video frame before the transcoding with that after the transcoding, it can be quickly and accurately determined whether the transcoded video after the transcoding has the problem of frame loss, frame drop, or sound and picture non-synchronization.

Specifically, the video parameter includes a video frame serial number. In this case, the process of determining the transcoding result for the to-be-transcoded video based on the video parameter contained in the test object in each video frame of the transcoded video is performed by the following operations of:

arranging, frame by frame, the video frame serial number contained in the test object in each video frame of the to-be-transcoded video to form a first serial number sequence, and arranging, frame by frame, the video frame serial number contained in the test object in each video frame of the transcoded video to form a second serial number sequence; and comparing the first serial number sequence with the second serial number sequence, and determining that the to-be-transcoded video is successfully transcoded in a case that the first serial number sequence matches the second serial number sequence.

In a specific implementation, whether the to-be-transcoded video is successfully transcoded is determined by taking the video parameter being the video frame serial number as an example.

Specifically, the video frame serial number contained in the test object in each video frame of the to-be-transcoded video is arranged frame by frame according to the order of all the video frames in the to-be-transcoded video to form the first serial number sequence.

Following the above example, the first serial number sequence formed by arranging, frame by frame, the video frame serial number contained in the test object in each video frame of the to-be-transcoded video according to the order of all the video frames in the to-be-transcoded video is [1, 2, 3].

Further, the video frame serial number contained in the test object in each video frame of the transcoded video is arranged frame by frame according to the order of all the video frames in the transcoded video to form the second serial number sequence.

For example, the transcoded video still includes three video frames arranged in an order of the video frame 1, the video frame 2, and the video frame 3. In this case, the second serial number sequence formed by arranging, frame by frame, the video frame serial number contained in the test object in each video frame of the transcoded video according to the order of all the video frames in the transcoded video is [1, 2, 3].

By comparing the first serial number sequence with the second serial number sequence, it is determined that the first serial number sequence fully matches the second serial number sequence. In this case, it can be determined that the to-be-transcoded video is successfully transcoded, which indicates that the current video transcoding system has a good transcoding quality.

In addition, if the to-be-transcoded video includes three video frames arranged in an order of the video frame 1, the video frame 3, and the video frame 2, the second serial number sequence formed by arranging, frame by frame, the video frame serial number contained in the test object in each video frame of the transcoded video according to the order of all the video frames in the transcoded video is [1, 3, 2].

By comparing the first serial number sequence with the second serial number sequence, it is determined that, the first serial number sequence does not match the second serial number sequence, and the video frame 2 and the video frame 3 are confused during the transcoding process, that is, the to-be-transcoded video is not successfully transcoded. In actual applications, the transcoded video may include four videos, for example, a certain video frame is repeatedly transcoded (i.e., frame drop). Further, the transcoded video may also include two video frames, for example, a certain video frame is lost. In these cases, the obtained second serial number sequence does not match the first serial number sequence, which indicates that the transcoding result for the to-be-transcoded video is unsuccessful, and the video transcoding system is required to be restored and adjusted based on a problematic video frame.

In the embodiment of the present disclosure, by comparing the first serial number sequence formed by arranging, frame by frame, the video parameter contained in the test object in each video frame of the to-be-transcoded video with the second serial number sequence formed by arranging, frame by frame, the video parameter contained in the test object in each video frame of the transcoded video, it can be quickly and accurately determined based on the comparison result whether the transcoding result for the to-be-transcoded video is correct, improving the user experience.

In practical applications, after the first serial number sequence is compared with the second serial number sequence, the video processing method further includes: in a case that the first serial number sequence does not match the second serial number sequence, determining a video frame corresponding to an unmatched serial number in the first serial number sequence and the second serial number sequence, as a verification video frame; and in a case that the verification video frame meets a predetermined transcoding condition, determining that the to-be-transcoded video is successfully transcoded.

The predetermined transcoding condition is set according to actual applications, which is not limited in the present disclosure. For example, the predetermined transcoding condition is that, the video frame 1 may be repeated or the video frame 2 may be lost during the transcoding process.

Following the above example, the transcoded video includes two video frames arranged in an order of the video frame 1 and the video frame 3, and the second serial number sequence formed by arranging, frame by frame, the video frame serial number contained in the test object in each video frame of the transcoded video according to the order of all the video frames in the transcoded video is [10, 12]. In this case, the first serial number sequence [10, 11, 12] does not match the second serial number sequence [10, 12], and it is determined that the unmatched video frame serial number in the first serial number sequence and the second serial number sequence is 11, and the video frame corresponding to the unmatched video frame serial number is the video frame 2 in the to-be-transcoded video, which is determined as the verification video frame.

If the predetermined transcoding condition is that the video frame 2 is required to be lost during the video transcoding process, it can be determined according to the predetermined transcoding condition that the verification video frame meets the predetermined transcoding condition, which indicates the to-be-transcoded video is successfully transcoded.

The embodiments of the present disclosure may be applied to various video transcoding scenarios. In some special video transcoding scenarios, the frame loss or the frame drop is allowed during the video transcoding process, to achieve video special effects or other requirements. Therefore, in the case that the first serial number sequence does not match the second serial number sequence, it is required to verify, based on the predetermined transcoding condition in a specific application scenario, whether the to-be-transcoded video is successfully transcoded, so as to expand application scenarios of the video processing method provided in the present disclosure and improve the user experience.

In a specific implementation, by the comparison between the video frame serial numbers before and after transcoding, it can be only determined whether the video after the transcoding has the problem of frame loss or frame drop. In actual applications, each video is paired with an audio, and an audio frame is set before a corresponding video frame. If the audio frame and the video frame are misaligned or the audio frame is lost during the video transcoding, the sound and picture non-synchronization occurs, greatly affecting the viewing experience of the user. Therefore, when determining that the video transcoding is successful based on the comparison between the video frame serial numbers before and after transcoding, it is further necessary to verify the audio in the video before and after transcoding, which is performed as follows.

The video parameter includes an audio frame quantity, and the process of determining that the to-be-transcoded video is successfully transcoded is performed by performing the following operations of: acquiring a current audio frame quantity of an audio frame before each video frame of the transcoded video; and in a case that the current audio frame quantity is the same as the audio frame quantity contained in the test object in each video frame of the transcoded video, determining that the to-be-transcoded video is successfully transcoded.

Specifically, when it is determined that the first serial number sequence matches the second serial number sequence, the current audio frame quantity of an audio frame before each video frame of the transcoded video is acquired, where the current audio frame quantity represents the actual quantity of audio frames before each video frame after the transcoding.

Following the above example, the transcoded video still includes the video frame 1, the video frame 2, and the video frame 3, and the acquired current audio frame quantity of the video frame 1 in the transcoded video is 3, and the current audio frame quantity of the video frame 2 in the transcoded video is 7, and the current audio frame quantity of the video frame 3 in the transcoded video is 10.

In addition, the audio frame quantity contained in the test object in the video frame 1 of the transcoded video is also 3, and the audio frame quantity contained in the test object in the video frame 2 of the transcoded video is also 7, and the audio frame quantity contained in the test object in the video frame 3 of the transcoded video is also 10. In this case, it can be determined that the actual quantity of audio frames before each video frame of the transcoded video is the same as the audio frame quantity contained in the two-dimensional code of each video frame of the transcoded video, and thus it can be determined that, in the video formed after the transcoding, not only no video frame has frame loss or frame drop, but also no audio frame has frame loss, and the order of the audio frames and the video frames in the video before the transcoding is the same as it in the video after the transcoding, and the video after the transcoding does not have the problem of sound and picture non-synchronization.

In another embodiment of the present disclosure, after the first serial number sequence is compared with the second serial number sequence, the video processing method further includes: in a case that the first serial number sequence does not match the second serial number sequence, determining a video frame corresponding to an unmatched serial number in the first serial number sequence and the second serial number sequence, as a verification video frame; in a case that the verification video frame meets a predetermined transcoding condition, acquiring the current audio frame quantity of an audio frame before each video frame of the transcoded video; and in a case that the current audio frame quantity is the same as the audio frame quantity contained in the test object in each video frame of the transcoded video, determining that the to-be-transcoded video is successfully transcoded.

For the predetermined transcoding condition, the detailed description in the above-mentioned embodiments may be referred to, which is not repeated herein.

In actual applications, a case that the first serial number sequence does not match the second serial number sequence but the unmatched verification video frame meets the predetermined transcoding condition may exist. In this case, if the actual quantity of audio frames before each video frame of the transcoded video is the same as the audio frame quantity contained in the two-dimensional code of each video frame of the transcoded video, it can be determined that not only the transcoded video meets the transcoding requirements, but also the transcoded video does not does not have the problem of sound and picture non-synchronization, greatly improving the user experience.

In an embodiment of the present disclosure, whether the to-be-transcoded video is successfully transcoded is quickly determined by directly comparing an audio frame quantity in each video frame of the video before the transcoding and an audio frame quantity in each video frame of the video after the transcoding, which is implemented as follows.

Specifically, the video parameter includes the audio frame quantity, and the process of determining the transcoding result for the to-be-transcoded video based on the video parameter contained in the test object in each video frame of the transcoded video is performed by performing the following operations of: acquiring a current audio frame quantity of an audio frame before each video frame of the transcoded video; and in a case that the current audio frame quantity is the same as the audio frame quantity contained in the test object in each video frame of the transcoded video, determining that the to-be-transcoded video is successfully transcoded.

In a specific implementation, the computer can automatically acquire and count the actual quantity of audio frames before each video frame of the transcoded video.

Specifically, the process of determining whether the current audio frame quantity is the same as the audio frame quantity contained in the test object in each video frame of the transcoded video is performed by performing the following operations of: arranging, frame by frame, the audio frame quantity contained in the test object in each video frame of the transcoded video to form a third serial number sequence; and arranging, frame by frame, the acquired current audio frame quantity of an audio frame before each video frame of the transcoded video to form a fourth serial number sequence; and comparing the third serial number sequence with the fourth serial number sequence, and in a case that the third serial number sequence fully matches the fourth serial number sequence, determining that the current audio frame quantity is the same as the audio frame quantity contained in the test object in each video frame of the transcoded video, and thus determining that the to-be-transcoded video is successfully transcoded.

Specifically, the audio frame quantity contained in the test object in each video frame of the transcoded video is arranged frame by frame according to an order of all video frames in the transcoded video to form the third serial number sequence.

Following the above example, the transcoded video includes the video frame 1, the video frame 2, and the video frame 3. In this case, the third serial number sequence formed by arranging, frame by frame, the audio frame quantity contained in the test object in each video frame of the transcoded video according to the order of all the video frames in the transcoded video is [3, 7, 10].

The acquired current audio frame quantity of an audio frame before each video frame of the transcoded video is arranged frame by frame according to an order of all video frames in the transcoded video to form the fourth serial number sequence.

For example, the acquired audio frame quantity of an audio frame before the video frame 1 of the transcoded video is 3, the acquired audio frame quantity of an audio frame before the video frame 2 of the transcoded video is 7, and the acquired audio frame quantity of an audio frame before the video frame 3 of the transcoded video is 10. In this case, the formed fourth serial number sequence is [3, 7, 10].

By comparing the third serial number sequence with the fourth serial number sequence, it is determined that the third serial number sequence fully matches the fourth serial number sequence. In this case, it can be determined that the to-be-transcoded video is successfully transcoded. In addition, if the acquired audio frame quantity of an audio frame before the video frame 1 of the transcoded video is 3, the acquired audio frame quantity of an audio frame before the video frame 2 of the transcoded video is 6, and the acquired audio frame quantity of an audio frame before the video frame 3 of the transcoded video is 10, the formed fourth serial number sequence is [3, 6, 10]. In this case, it is determined that the third serial number sequence [3, 7, 10] does not match the fourth serial number sequence [3, 6, 10]. The current audio frame quantity is not the same as the audio frame quantity contained in the test object in each video frame of the transcoded video, and it can be determined that, one audio frame is lost before the video frame 2 in the transcoded video, and one audio frame is added before the video frame 3 in the transcoded video, the position of the audio frames and the video frames in the transcoded video is disordered, which results in the sound and picture non-synchronization during actual playing. In practical applications, a case that all audio frames are before a certain video frame in the transcoded video may exist. For example, the audio frame quantity of an audio frame before the video frame 1 in the transcoded video is 0, and the audio frame quantity of an audio frame before the video frame 2 is 0, and the audio frame quantity of an audio frame before the video frame 3 is 10. For another example, the audio frame quantity of an audio frame before the video frame 1 in the transcoded video is 0, the audio frame quantity of an audio frame before the video frame 2 is 10, and the audio frame quantity of an audio frame before the video frame 3 is 10. In these cases, it can be determined that the transcoded video has the problem of sound and picture non-synchronization.

In the embodiment of the present disclosure, by comparing the audio frame quantity contained in each video frame of the transcoded video after the transcoding with the actually acquired audio frame quantity of each video frame of the transcoded video, it can be accurately determined whether the transcoding result for the to-be-transcoded video is successful.

In another embodiment of the present disclosure, by the comparison between the video frame serial numbers before and after transcoding, it can be only determined whether the video after transcoding has the problem of frame loss or frame drop. In the actual video transcoding process, the resolution of the video frame may change, for example, a low-resolution video is converted to a high-resolution video. In this case, if the video frame serial numbers before and after the transcoding are the same, and the video resolution of the transcoded video after transcoding may be different from the video resolution of the to-be-transcoded video before transcoding, the transcoded video is still a successfully transcoded video that meets the requirements of the specific scene, which is performed as follows.

The video parameter includes a video frame resolution, and the process of determining that the to-be-transcoded video is successfully transcoded is performed by the following operations of: acquiring a current video frame resolution of each video frame of the transcoded video; in a case that the current video frame resolution is different from the video frame resolution contained in the test object in each video frame of the transcoded video, determining a video frame in the transcoded video having a video frame resolution different from the current video frame resolution, as a verification video frame; and in a case that the verification video frame meets a predetermined transcoding condition, determining that the to-be-transcoded video is successfully transcoded.

The current video frame resolution may be understood as an actual video frame resolution.

Specifically, when comparing the video parameter of the video before the transcoding with the video parameter of the video after the transcoding, in the case that the actual video frame resolution of each video frame of the transcoded video after the transcoding is different from the video frame resolution contained in the test object in each video frame of the transcoded video but the video frame of the transcoded video with the different video frame resolution meets the predetermined transcoding condition set in the specific application scenario, the to-be-transcoded video can be considered as being successfully transcoded.

Correspondingly, in a case that the video frame color space of the video before the transcoding is different from the video frame color space of the video after the transcoding, the following determination may be made.

The video parameter includes a video frame color space, and the process of determining that the to-be-transcoded video is successfully transcoded is performed by the following operations of: acquiring a current video frame color space of each video frame of the transcoded video; in a case that the current video frame color space is different from the video frame color space contained in the test object in each video frame of the transcoded video, determining a video frame in the transcoded video having a video frame color space different from the current video frame color space, as a verification video frame; and in a case that the verification video frame meets a predetermined transcoding condition, determining that the to-be-transcoded video is successfully transcoded.

The current video frame color space may be understood as an actual video frame color space.

Specifically, when comparing the video parameter of the video before the transcoding with the video parameter of the video after the transcoding, in the case that the actual video frame color space of each video frame of the transcoded video after the transcoding is different from the video frame color space contained in the test object in each video frame of the transcoded video but the video frame of the transcoded video with the different video frame color space meets the predetermined transcoding condition set in the specific application scenario, the to-be-transcoded video can be considered as being successfully transcoded.

In the embodiment of the present disclosure, when determining the transcoding result for the to-be-transcoded video based on the video parameters contained in the test object in each video frame of the video before and after transcoding, the transcoding result for the to-be-transcoded video is not simply determined based on a matter of whether the video parameters match, but is accurately determined based on a relationship between the predetermined transcoding condition set in the actual application scenario and the video parameter.

In the embodiments of the present disclosure, in certain scenarios, the transcoding result for the to-be-transcoded video is determined only based on a comparison between the video frame serial numbers, the audio frame quantities, the video frame resolutions, or the color spaces contained in the test object in the video frame of the video before and after transcoding. For example, if it is required that the video frame resolution and the color space before the transcoding cannot be changed after the transcoding, the transcoding result for the to-be-transcoded video is determined based on the comparison between the video frame resolutions before and after transcoding and the comparison between the color spaces before and after transcoding.

In addition, the transcoding result for the to-be-transcoded video may be determined based on a comparison between the video frame serial numbers contained in the test object in the video frame of the video before and after transcoding in combination with a comparison between the audio frame quantities before and after transcoding, a comparison between the video frame resolutions before and after transcoding, or a comparison between the color spaces before and after transcoding. For example, when it is determined based on the video frame serial number that the video frame of the to-be-transcoded video does not have frame loss or frame drop, it is determined further based on the audio frame quantity whether the transcoding result for the to-be-transcoded video has the problem of sound and picture non-synchronization. In addition, when it is determined based on the video frame serial number that the video frame of the to-be-transcoded video does not have frame loss or frame drop, it is determined further based on the video frame resolution or the color space whether the transcoding result for the to-be-transcoded video has the problem of picture deterioration in the video frame. The combination between the video parameters is set according to actual requirements, which is not limited in the present disclosure.

In another embodiment of the present disclosure, the video parameter includes video frame encapsulation information, and the process of determining that the to-be-transcoded video is successfully transcoded is performed by the following operations of: acquiring current video frame encapsulation information of each video frame of the transcoded video; in a case that the current video frame encapsulation information is different from the video frame encapsulation information contained in the test object in each video frame of the transcoded video, determining a video frame in the transcoded video having a video frame encapsulation information different from the current video frame encapsulation information, as a verification video frame; and in a case that the verification video frame meets a predetermined transcoding condition, determining that the to-be-transcoded video is successfully transcoded.

The video frame encapsulation information includes parameter information of an encapsulation layer and parameter information of a coding layer, such as a coding format of the video frame, an encapsulation serial number of the video frame. The current video frame encapsulation information may be understood as actual video frame encapsulation information.

In actual applications, the test object in each video frame of the to-be-transcoded video contains the corresponding video frame encapsulation information, and the video frame encapsulation information is not lost with the video transcoding. Therefore, after the to-be-transcoded video is transcoded into a transcoded video, the video frame encapsulation information of the to-be-transcoded video is compared with the video frame encapsulation information of the transcoded video after transcoding, which can effectively determine what abnormality occurs in the transcoding of the transcoded video, what changes have occurred in the video frame and/or audio frame in the transcoded video, or the like. The transcoding result for the to-be-transcoded video can be quickly determined only based on the video frame encapsulation information contained in the test objects of the video frames before and after transcoding.

In the video processing method according to the embodiments of the present disclosure, a test object containing a video parameter is set in each video frame of the to-be-transcoded video, and the video parameter contained in the test object in each video frame before the transcoding is compared with that after the transcoding, so that it can be quickly and accurately determined whether the video after the transcoding has the problem of frame loss, frame drop, or sound and picture non-synchronization.

Figure 3:
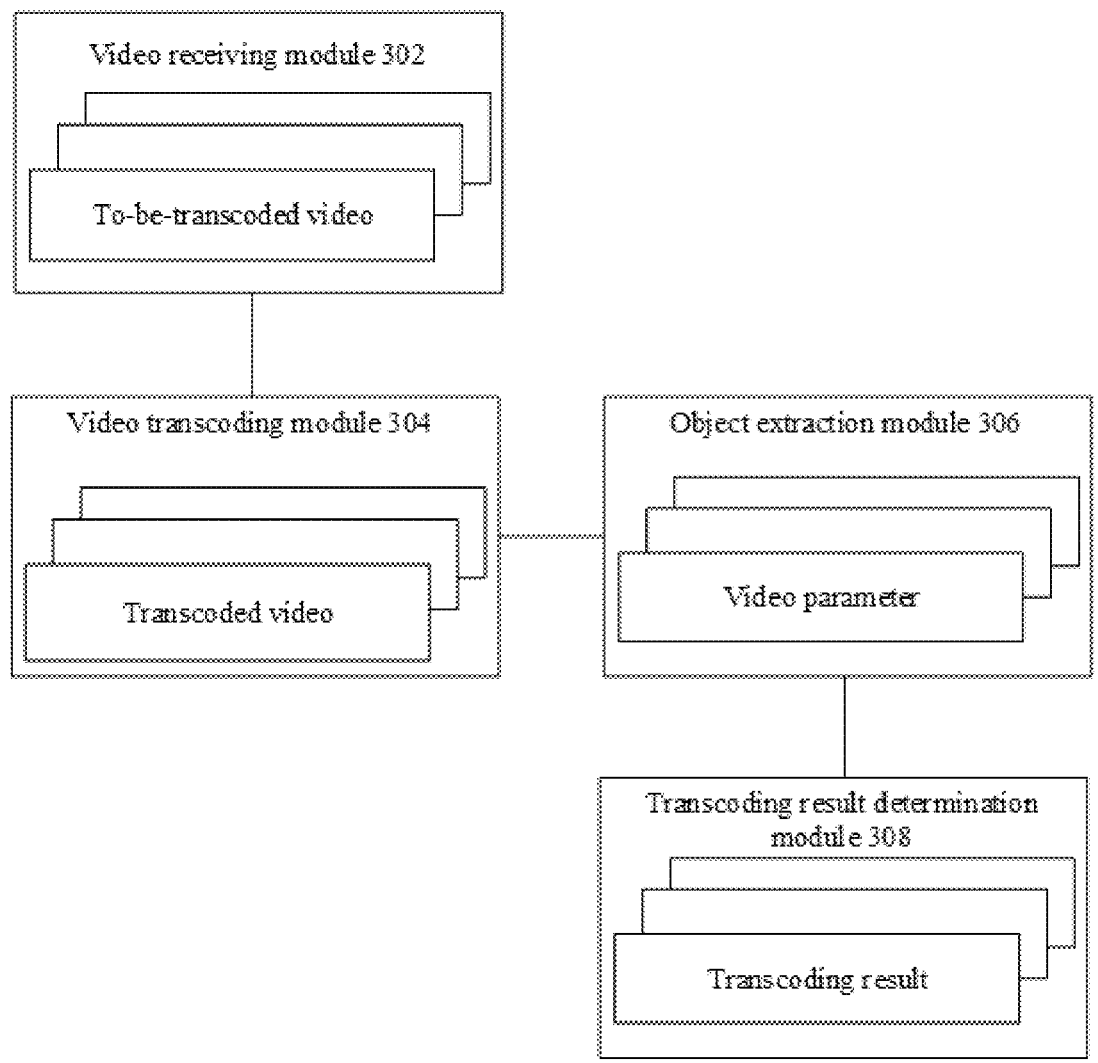
FIG. 3 is a schematic structural diagram of a video processing device according to an embodiment of the present disclosure.

Corresponding to the above method embodiments, embodiments of a video processing device are further provided in the present disclosure. FIG. 3 shows a schematic structural diagram of a video processing device according to an embodiment of the present disclosure. As shown in FIG. 3, the video processing device includes: a video receiving module 302, a video transcoding module 304, an object extraction module 306, and a transcoding result determination module 308.

The video receiving module 302 is configured to receive a to-be-transcoded video and set a test object containing a video parameter in each video frame of the to-be-transcoded video.

The video transcoding module 304 is configured to send the to-be-transcoded video to a predetermined video transcoding system for video transcoding, and receive a transcoded video returned by the video transcoding system.

The object extraction module 306 is configured to extract a test object in each video frame of the transcoded video, and acquire a video parameter contained in the test object in each video frame of the transcoded video.

The transcoding result determination module 308 is configured to determine a transcoding result for the to-be-transcoded video based on the video parameter contained in the test object in each video frame of the transcoded video.

In an embodiment, the transcoding result determination module 308 is further configured to: arrange, frame by frame, the video parameter contained in the test object in each video frame of the to-be-transcoded video to form a first serial number sequence; arrange, frame by frame, the video parameter contained in the test object in each video frame of the transcoded video to form a second serial number sequence; and compare the first serial number sequence with the second serial number sequence, and determine that the to-be-transcoded video is successfully transcoded in a case that the first serial number sequence fully matches the second serial number sequence.

In an embodiment, the video parameter includes a video frame serial number, and the transcoding result determination module 308 is further configured to: arrange, frame by frame, the video frame serial number contained in the test object in each video frame of the to-be-transcoded video to form a first serial number sequence, and arrange, frame by frame, the video frame serial number contained in the test object in each video frame of the transcoded video to form a second serial number sequence; and compare the first serial number sequence with the second serial number sequence, and determine that the to-be-transcoded video is successfully transcoded in a case that the first serial number sequence matches the second serial number sequence In an embodiment, the video processing device further includes a first verification module. The first verification module is configured to: in a case that the first serial number sequence does not match the second serial number sequence, determine a video frame corresponding to an unmatched serial number in the first serial number sequence and the second serial number sequence, as a verification video frame; and in a case that the verification video frame meets a predetermined transcoding condition, determine that the to-be-transcoded video is successfully transcoded.

In an embodiment, the video parameter includes an audio frame quantity, and the transcoding result determination module 308 is further configured to: acquire a current audio frame quantity of an audio frame before each video frame of the transcoded video; and in a case that the current audio frame quantity is the same as the audio frame quantity contained in the test object in each video frame of the transcoded video, determine that the to-be-transcoded video is successfully transcoded.

In an embodiment, the video processing device further includes a second verification module. The second verification module is configured to: in a case that the first serial number sequence does not match the second serial number sequence, determine a video frame corresponding to an unmatched serial number in the first serial number sequence and the second serial number sequence, as a verification video frame; in a case that the verification video frame meets a predetermined transcoding condition, acquire the current audio frame quantity of an audio frame before each video frame of the transcoded video; and in a case that the current audio frame quantity is the same as the audio frame quantity contained in the test object in each video frame of the transcoded video, determine that the to-be-transcoded video is successfully transcoded.

In an embodiment, the video parameter includes a video frame resolution, and the transcoding result determination module 308 is further configured to: acquire a current video frame resolution of each video frame of the transcoded video; in a case that the current video frame resolution is different from the video frame resolution contained in the test object in each video frame of the transcoded video, determine a video frame in the transcoded video having a video frame resolution different from the current video frame resolution, as a verification video frame; and in a case that the verification video frame meets a predetermined transcoding condition, determine that the to-be-transcoded video is successfully transcoded.

In an embodiment, the video parameter includes a video frame color space, and the transcoding result determination module 308 is further configured to: acquire a current video frame color space of each video frame of the transcoded video; in a case that the current video frame color space is different from the video frame color space contained in the test object in each video frame of the transcoded video, determine a video frame in the transcoded video having a video frame color space different from the current video frame color space, as a verification video frame; and in a case that the verification video frame meets a predetermined transcoding condition, determine that the to-be-transcoded video is successfully transcoded.

In an embodiment, the video parameter includes video frame encapsulation information, and the transcoding result determination module 308 is further configured to: acquire current video frame encapsulation information of each video frame of the transcoded video; in a case that the current video frame encapsulation information is different from the video frame encapsulation information contained in the test object in each video frame of the transcoded video, determine a video frame in the transcoded video having a video frame encapsulation information different from the current video frame encapsulation information, as a verification video frame; and in a case that the verification video frame meets a predetermined transcoding condition, determine that the to-be-transcoded video is successfully transcoded.

In an embodiment, the test object includes a two-dimensional code.

In the video processing device according to the embodiments of the present disclosure, a test object containing a video parameter is set in each video frame of the to-be-transcoded video, and the video parameter contained in the test object in each video frame before the transcoding is compared with that after the transcoding, so that it can be quickly and accurately determined whether the video after the transcoding has the problem of frame loss, frame drop, or sound and picture non-synchronization.

Figure 4:
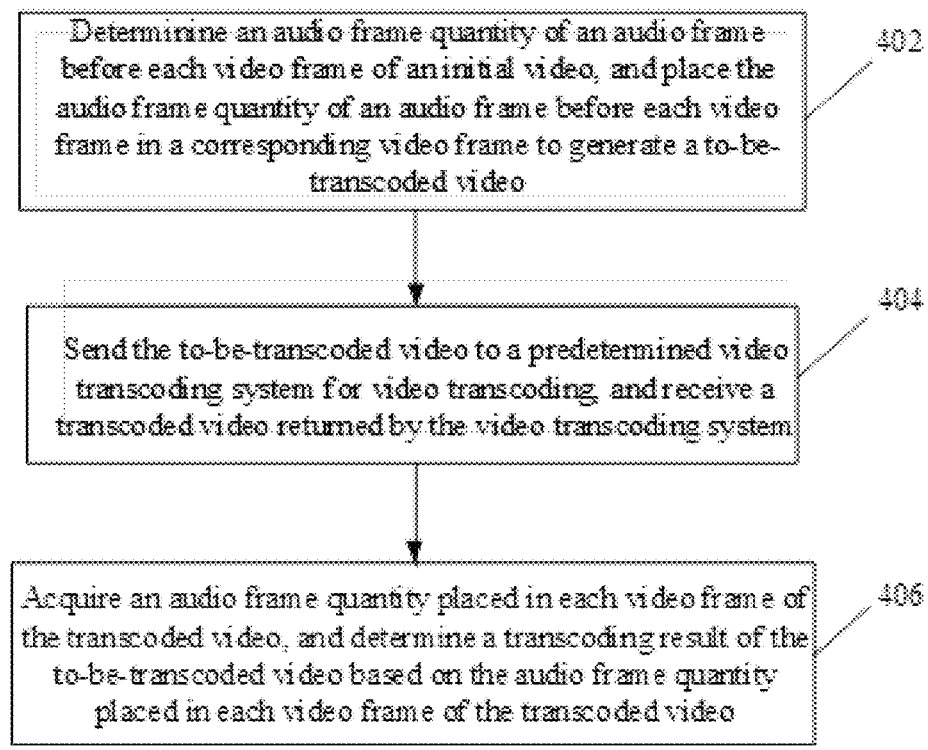
FIG. 4 is a flowchart of a video processing method according to an embodiment of the present disclosure.

Reference is made to FIG. 4, which shows a flowchart of a video processing method provided according to an embodiment of the present disclosure. The video processing method includes the following steps 402 to 406.

In step 402, an audio frame quantity of an audio frame before each video frame of an initial video is determined, and the audio frame quantity of an audio frame before each video frame is placed in a corresponding video frame to generate a to-be-transcoded video.

The video processing method according to the embodiment of the present disclosure is applied to a scenario in which a sound and picture quality of a video transcoding system is tested. Firstly, a special initial video is generated based on a user requirement. An audio frame quantity of an audio frame before each video frame of the initial video is determined. The audio frame quantity of an audio frame before each video frame in the initial video before transcoding is compared with that in the transcoded video after transcoding, to determine whether the video transcoding system has transcoding quality problems. For example, if the audio frame quantity of an audio frame before each video frame in the initial video before transcoding is always the same as that in the transcoded video after transcoding, it is indicated that the transcoding is successful. In addition, if the audio frame quantity of an audio frame before a certain video frame in the initial video before transcoding is not the same as that in the transcoded video after transcoding, it is indicated that the video transcoding system has transcoding quality problems, such as frame loss, frame drop, or sound and picture non-synchronization. In this case, the video transcoding system is required to be restored.

The initial video may be understood as a video of any type and length, such as a short video or a television drama video, or an entertainment show video.

In order to detect whether there exists frame loss, frame loss, or sound and picture non-synchronization in the video, the initial video is required to be detected for the user when transcoding the video for the user in the transcoding system. Conditions of the initial video, for example, the type and the length of the initial video, are not limited in the present disclosure.

Specifically, the process of determining an audio frame quantity of an audio frame before each video frame of an initial video is performed by the following operations of: acquiring the initial video, and determining the audio frame quantity of the audio frame before each video frame of the initial video by a predetermined audio frame extraction tool.

The predetermined audio frame extraction tool may be understood as a computer program required in the process of processing video transcoding that is used to extract an audio frame. For example, the ffmpeg tool may be used to extract the audio frame to determine the audio frame quantity. The methods and tools for extracting the audio frame are not limited in the present disclosure.

In a specific implementation, a server acquires a video in which the sound and picture non-synchronization is required to be detected, as the initial video. The predetermined audio frame extraction tool performs processing on the initial video to determine an audio frame quantity of an audio frame before each video frame. For example, in the initial video, an audio frame quantity of an audio frame before a first video frame is determined as 3, an audio frame quantity of an audio frame before a second video frame is determined as 9, and an audio frame quantity of an audio frame before a third video frame is determined as 13. It should be noted that, cumulative statistics is performed on the audio frame before each video frame arranged in order, and the audio frame quantity is increasing. If the audio frame quantity in each video frame does not increase in the initial video, for example, the audio frame quantity of the audio frame before the first video frame is 3, the audio frame quantity of the audio frame before the second video frame is 13, and the audio frame quantity of the audio frame before the third video frame is 9, the predetermined audio frame extraction tool may be damaged. In this case, the predetermined audio frame extraction tool is reacquired to extract an audio frame from the initial video, so as to determine the audio frame quantity of the audio frame before each video frame.

In the embodiment of the present disclosure, the audio frame extraction tool is used to extract the audio frame before each video frame in the initial video, and the audio frame quantity is counted, so as to determine whether the initial video is successfully transcoded according to the audio frame quantity, thereby realizing the sound and picture synchronization of the video.

In order to further compare the audio frame before each video frame in the initial video with the audio frame before each video frame in the transcoded video to determine whether the audio frame quantity of the audio frame before each video frame in the initial video is the same as that in the transcoded video, the audio frame before each video frame is recorded. Specifically, the audio frame quantity of the audio frame before each video frame is placed at a predetermined position in the corresponding video frame by a watermarking technology to generate the to-be-transcoded video.

The predetermined position may be understood as a position where the audio frame quantity is placed in the video frame in advance. For example, the audio frame quantity is placed at any position of the entire video frame, such as an upper left corner, an upper right corner, a center, and a lower left corner of the video frame, which is not limited in the embodiments of the present disclosure.

It should be noted that, the audio frame quantity may be placed at the predetermined position in the video frame in a watermarking manner or in other recording manners, which is not limited herein.

In an implementation, an audio frame quantity of an audio frame before each video frame of the initial video is counted, and the audio frame quantity is placed at a predetermined position in the video frame corresponding to the audio frame quantity in a watermark manner. A video in which each video frame has a watermark indicating an audio frame quantity is determined as a to-be-transcoded video for subsequent video transcoding.

Figure 5:
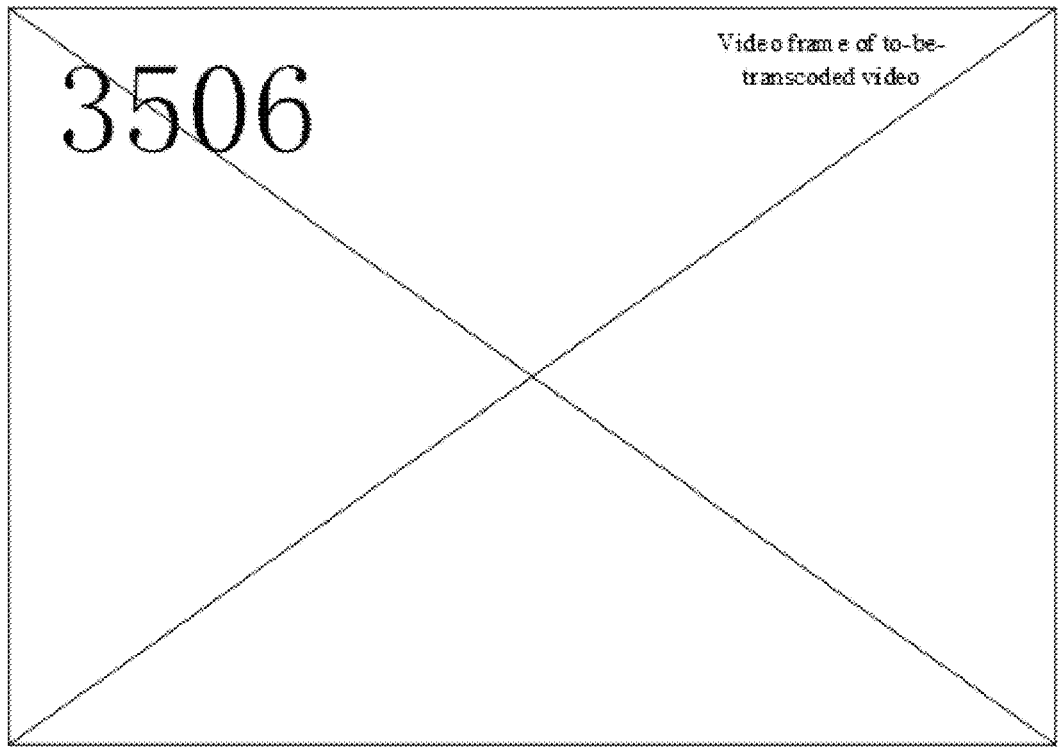
FIG. 5 is a schematic diagram showing a video frame of a to-be-transcoded video in a video processing method according to an embodiment of the present disclosure.

Reference is made to FIG. 5, which is a schematic diagram showing a video frame of a to-be-transcoded video in a video processing method according to an embodiment of the present disclosure.

FIG. 5 shows a schematic diagram of a video frame in the to-be-transcoded video. A value representing an audio frame quantity is displayed at an upper left corner of the video frame. For example, a value of 3506 shown in FIG. 5 indicates that an audio frame quantity of an audio frame before the video frame is 3506. The value representing the audio frame quantity is placed at the upper left corner of the video frame. It should be noted that, each video frame in the to-be-transcoded video is placed with a value of an audio frame quantity of an audio frame before the video frame, in order to facilitate subsequent comparison with an audio frame quantity of an audio frame before each video frame in the transcoded video.

In the embodiment of the present disclosure, an audio frame quantity of an audio frame before each video frame is placed in the video frame to form a to-be-transcoded video, so as to quickly and accurately determine whether the video has sound and picture non-synchronization based on the audio frame quantity placed in the video frame.

In step 404, the to-be-transcoded video is sent to a predetermined video transcoding system for video transcoding, and the transcoded video returned by the video transcoding system is received.

The predetermined video transcoding system includes any video transcoding system whose transcoding quality is to be tested, for example, a video transcoding system using the AAC technology, which is not limited in the present disclosure.

Specifically, after an initial video including multiple video frames is generated, the initial video is sent to a video transcoding system whose transcoding quality is required to be tested, to be transcoded. A transcoded video that is generated after the initial video is transcoded by the video transcoding system and that is returned by the video transcoding system is received.

In an implementation, an audio frame quantity of an audio frame before each video frame in the initial video is recorded, the audio frame quantity is placed at a predetermined position in the video frame, to form a to-be-transcoded video. The formed to-be-transcoded video is sent to a predetermined video transcoding system for video transcoding. A transcoded video returned by the video transcoding system is received.

In step 406, an audio frame quantity placed in each video frame of the transcoded video is acquired, and a transcoding result of the to-be-transcoded video is determined based on the audio frame quantity placed in each video frame of the transcoded video.

Specifically, after the transcoded video is obtained, an audio frame quantity placed in each video frame of the transcoded video is acquired. Based on the audio frame quantity placed in each video frame of the transcoded video and an actual audio frame quantity of an audio frame before each video frame in the transcoded video, the transcoding result of the to-be-transcoded video is determined.

Since the sound and picture non-synchronization may exist in the transcoding of the initial video, a transcoded video frame and a transcoded audio frame obtained after the transcoding may appear out of order. In this case, the statistics is performed on the audio frame before each video frame of the transcoded video, to be compared with the audio frame quantity of an audio frame before each video frame of the video before the transcoding, so as to determine the transcoding result of the transcoded video.

In an implementation, an actual audio frame quantity of an audio frame before each video frame of the transcoded video is recorded and placed at the predetermined position in each video frame of the transcoded video, and then is compared with the audio frame quantity placed in each audio frame of the to-be-transcoded video.

Figure 6:
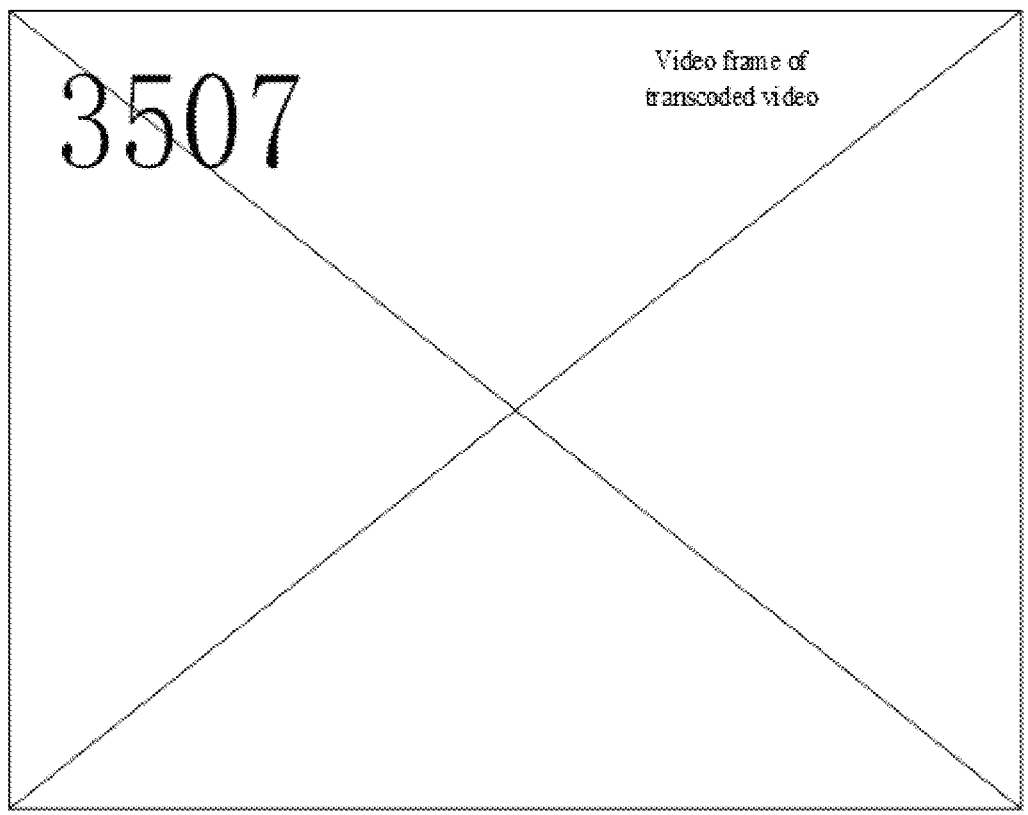
FIG. 6 is a schematic diagram showing a video frame of a transcoded video in a video processing method according to an embodiment of the present disclosure.

Reference is made to FIG. 6, which is a schematic diagram showing a video frame of a transcoded video in a video processing method according to an embodiment of the present disclosure.

FIG. 6 shows a schematic diagram of a video frame in the transcoded video. A value representing a current actual audio frame quantity is displayed at an upper left corner of the video frame. For example, a value of 3507 shown in FIG. 6 indicates that a current audio frame quantity of an audio frame before the video frame is 3507. The value representing the audio frame quantity is placed at the upper left corner of the video frame. It should be noted that, the actual audio frame quantity of an audio frame before each video frame in the transcoded video is counted and is placed at the predetermined position in the video frame of the transcoded video, in order to facilitate subsequent comparison with the audio frame quantity placed in each video frame of the to-be-transcoded video.

By comparing the audio frame quantity placed in each video frame of the transcoded video with the audio frame quantity placed at the upper left corner of each video frame of the to-be-transcoded video before the transcoding, whether the audio frame quantity of an audio frame before the video frame of the transcoded video is the same as that in the to-be-transcoded video before the transcoding can be determined, and thus whether the sound and picture non-synchronization exists in the transcoded video can be determined.

In order to record the comparison between the audio frame before the video frame before the transcoding and the audio frame before the video frame after the transcoding and further determine the transcoding result of the to-be-transcoded video, the process of determining the transcoding result of the to-be-transcoded video based on the audio frame quantity placed in each video frame of the transcoded video is performed by the following operations including: arranging, frame by frame, the audio frame quantity placed in each video frame of the to-be-transcoded video to form a first quantity sequence, and arranging, frame by frame, the audio frame quantity placed in each video frame of the transcoded video to form a second quantity sequence; comparing the first quantity sequence with the second quantity sequence; and determining that the to-be-transcoded video is successfully transcoded in a case that the first quantity sequence fully matches the second quantity sequence.

The first quantity sequence may be understood as a quantity sequence formed by arranging the audio frame quantity placed in each video frame of the to-be-transcoded video frame by frame. For example, the audio frame quantity placed in each video frame of the to-be-transcoded video is arranged frame by frame according to an order in which all video frames in the to-be-transcoded video are arranged, and a first quantity sequence of [3506, 3507, 3510] is formed.

Further, the audio frame quantity placed in each video frame of the transcoded video is arranged frame by frame to form the second quantity sequence. Still following the above example, if the transcoded video includes three video frames arranged in sequence, which respectively are a video frame 1, a video frame 2 and a video frame 3, an actual audio frame quantity of an audio frame before each video frame in the transcoded video is arranged frame by frame according to an order in which the three video frames are arranged, and a second quantity sequence of [3506, 3507, 3510] is formed.

By comparing the first quantity sequence with the second quantity sequence, it is determined that the first quantity sequence matches fully the second quantity sequence. In this case, it can be determined that the initial video is successfully transcoded, indicating that, the current video transcoding system has a good transcoding quality, video frames in the transcoded video are respectively the same as those in the video before the transcoding, and neither frame loss nor frame drop exists in the transcoded video, and the transcoded video meets the condition of sound and picture synchronization.

In the embodiment of the present disclosure, the audio frame quantity of an audio frame before each video frame of the initial video, that is obtained by the statistics, is compared with the audio frame quantity of an audio frame before each video frame of the transcoded video obtained after the transcoding, so that whether the transcoding result of the initial video has the sound and picture non-synchronization can be quickly and accurately determined based on the comparison result, thereby improving the user experience.

Figure 7:
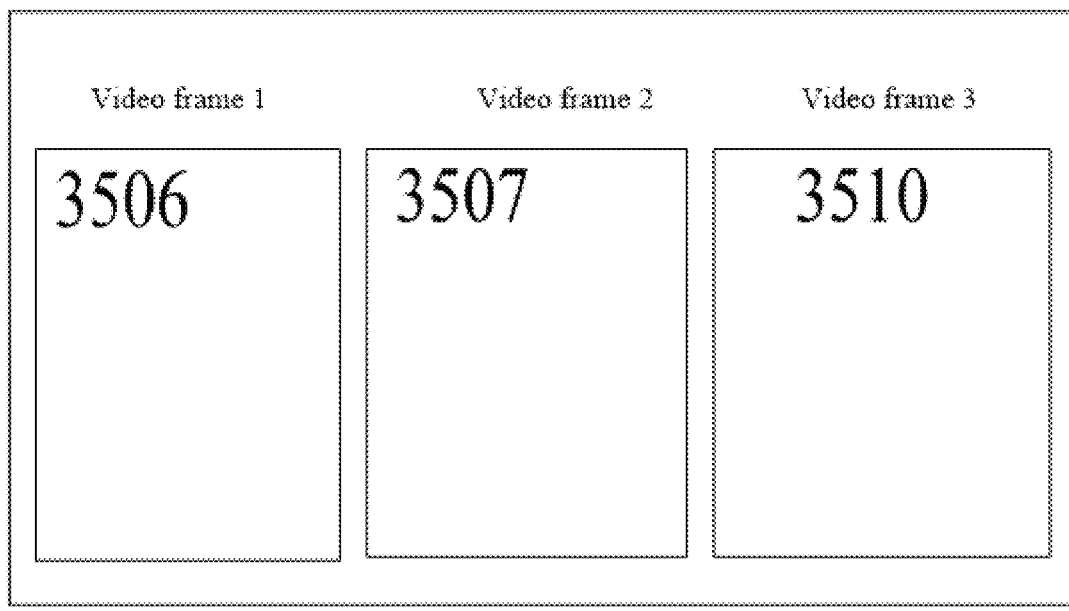
FIG. 7 is a schematic diagram showing an audio frame quantity placed in each video frame of a transcoded video in a video processing method according to an embodiment of the present disclosure.

Reference is made to FIG. 7, which is a schematic diagram showing an audio frame quantity placed in each video frame of a transcoded video in a video processing method according to an embodiment of the present disclosure.

The transcoded video in FIG. 7 is illustrated with three video frames as an example, including a video frame 1, a video frame 2, and a video frame 3. An audio frame quantity placed in the video frame 1 is 3506, and an audio frame quantity placed in the video frame 2 is 3507, and an audio frame quantity placed in the video frame 3 is 3510.

The predetermined position at which the audio frame quantity is placed in the video frame is the upper left corner of the video frame. In this case, the audio frame quantities are each arranged at the upper left corner of the corresponding video frame to display the audio frame quantity placed in the video frame. That is, the audio frame quantity 3506 placed in the video frame 1 is displayed at the upper left corner of the video frame 1, the audio frame quantity 3507 placed in the video frame 2 is displayed at the upper left corner of the video frame 2, and the audio frame quantity 3510 placed in the video frame 3 is displayed at the upper left corner of the video frame 3.

The process of determining that the transcoding of the to-be-transcoded video is successfully transcoded includes: acquiring a current audio frame quantity of an audio frame before each video frame of the transcoded video; and determining that the to-be-transcoded video is successfully transcoded in a case that the current audio frame quantity is the same as the audio frame quantity placed in each video frame of the transcoded video.

In an implementation, after determining the audio frame quantity placed in each video frame of the transcoded video, a current audio frame quantity of an audio frame before each video frame of the transcoded video is acquired. The acquired current audio frame quantity is compared with the audio frame quantity placed at the upper left corner of the video frame. If the current audio frame quantity of an audio frame before the video frame 1 is 3506, the current audio frame quantity of an audio frame before the video frame 2 is 3507, and the current audio frame quantity of an audio frame before the video frame 3 is 3510, it is determined that none of the video frame 1, the video frame 2, and the video frame 3 has the frame loss, the frame drop, or the sound and picture non-synchronization.

In the embodiment of the present disclosure, in order to more conveniently determine the audio frame quantity placed in each video frame of the transcoded video, the audio frame quantity is displayed in each video frame of the transcoded video. The current audio frame quantity of an audio frame before each video frame of the transcoded video is acquired, so as to be quickly and accurately compared with the audio frame quantity displayed in each video frame of the transcoded video.

In addition, after comparing the first quantity sequence with the second quantity sequence, the video processing method further includes: in a case that the first quantity sequence does not match the second quantity sequence, determining a video frame corresponding to an unmatched quantity in the first quantity sequence and the second quantity sequence, as a verification video frame; and in a case that the verification video frame meets a predetermined transcoding condition, determining that the to-be-transcoded video is successfully transcoded.

The predetermined transcoding condition may be understood as a transcoding video condition that is met after a predetermined to-be-transcoded video is transcoded.

Still following the above example, if the transcoded video includes three video frames arranged in sequence, which respectively are a video frame 1, a video frame 3, and a video frame 2, an audio frame quantity of an audio frame before each video frame in the transcoded video is arranged frame by frame according to an order in which the three video frames are arranged in the transcoded video, and a second quantity sequence of [3506, 3510, 3507] is formed.

By comparing the first quantity sequence with the second quantity sequence, it is determined that the first quantity sequence does not match the second quantity sequence. In this case, it can be determined that the initial video is unsuccessfully transcoded, that is, the video frame 2 and the video frame 3 after transcoding are out of order, indicating that, the current video transcoding system has a poor transcoding quality, and the sound and picture non-synchronization exists in the transcoded video. The video transcoding system is required to be restored. Further, a wrong video frame can be quickly located based on the unmatched quantity, and the problem can be analyzed based on the wrong video frame when restoring the video transcoding system. In addition, the comparison may be performed starting from a last video frame. If a current audio frame quantity of an audio frame before a last video frame of the transcoded video does not match an audio frame quantity placed in a last video frame of the to-be-transcoded video, it is determined that the sound and picture non-synchronization may exist, and in this case, the video transcoding system is required to be restored.

In an implementation, the video frame corresponding to the unmatched quantity in the first quantity sequence and the second quantity sequence is used as a verification video frame, and it is determined whether the verification video frame meets a predetermined transcoding condition. In a case that the verification video frame meets the transcoding condition, it is determined that the to-be-transcoded video is successfully transcoded.

For example, the to-be-transcoded video includes three video frames arranged in sequence, which respectively are a video frame 1, a video frame 2, and a video frame 3. The transcoded video after the transcoding includes two video frames arranged in sequence, which respectively are the video frame 1 and the video frame 3. In this case, the video frame 2 is lost. The video frame 2 is used as the verification video frame, and it is determined whether the video frame 2 meets the predetermined transcoding condition. It should be noted that, if the video effect is enhanced after the video frame 2 is lost, the video frame 2 meets the predetermined transcoding condition. In addition, if the transcoded video includes four video frames arranged in sequence, which respectively are the video frame 1, the video frame 2, the video frame 2, and the video Frame 3, where the video frame 2 is repeatedly transcoded (i.e., having frame drop) in the transcoded video frame after the transcoding to enhance the effect of the video frame, that is, the video frame 2 meets the predetermined transcoding condition.

In actual applications, in a case that the verification video frame meets the predetermined transcoding condition, it can be determined that the to-be-transcoded video is successfully transcoded, even if the frame loss or the frame drop exists in the transcoded video. In a case that the verification video frame does not meet the predetermined transcoding condition, that is, in a case that the frame loss or the frame drop exists in the transcoded video, it can be determined that the sound and picture non-synchronization likely exists in the transcoded video, and in this case, the audio frame quantity of an audio frame before each video frame is not required to be recorded again for comparison.

In the embodiment of the present disclosure, the audio frame quantity of an audio frame before each video frame of the initial video, that is obtained by the statistics, is compared with the audio frame quantity of an audio frame before each video frame of the transcoded video obtained after the transcoding, so that whether the transcoding result of the initial video is correct can be quickly and accurately determined based on the comparison result. In a case that the transcoding result of the initial video is inaccurate, it is determined whether the unmatched video meets the predetermined transcoding condition to further determine whether the transcoded video meets a user requirement, and the transcoding system is restored based on a situation of the determination.

Further, after comparing the first quantity sequence with the second quantity sequence, the video processing method further includes:

in a case that a last quantity in the first quantity sequence does not match a last quantity in the second quantity sequence, determining a video frame corresponding to an unmatched quantity in the first quantity sequence and the second quantity sequence by a predetermined determination method;

determining the video frame corresponding to the unmatched quantity in the first quantity sequence and the second quantity sequence, as a verification video frame; and in a case that the verification video frame meets a predetermined transcoding condition, determining that the to-be-transcoded video is successfully transcoded.

The predetermined determination method may be understood as a method of determining the video frame corresponding to the unmatched quantity in the first quantity sequence and the second quantity sequence. For example, the predetermined determination method may be a bisection method, which is not limited in this specification.

Specifically, the server compares the last quantity in the first quantity sequence formed based on the to-be-transcoded video with the last quantity in the second quantity sequence formed based on the transcoded video. If the last quantity in the first quantity sequence does not match a last quantity in the second quantity sequence, it can be preliminarily determined that the sound and picture non-synchronization likely exists in the transcoded video. Furthermore, the video frame corresponding to the unmatched quantity in the first quantity sequence and the second quantity sequence can be determined by the predetermined determination method. The video frame can be used as a verification video frame. In the case that the verification video frame meets the predetermined transcoding condition, it is determined that the to-be-transcoded video is successfully transcoded.

For example, the to-be-transcoded video includes five video frames, which are respectively a video frame 1, a video frame 2, a video frame 3, a video frame 4, and a video frame 5, the formed first quantity sequence is [1024, 2504, 3406, 3456, 3510], and the second quantity sequence formed based on the transcoded video after the transcoding is [1024, 2504, 3406, 3510, 3456]. In this case, by comparing the last quantity [3510] of the first quantity sequence with the last quantity [3456] of the second quantity sequence, it can be determined that the last quantity in the first quantity sequence does not match the last quantity in the second quantity sequence, and it can further be determined that the sound and picture non-synchronization likely exists in the transcoded video. The server may compare the quantity [3406] of the video frame 3 in the first quantity sequence with the quantity [3406] of the video frame 3 in the second quantity sequence by the bisection method, to determine that no unmatched audio frame quantity exists before the video frame 3. Further, the server compares the quantity [3456] of the video frame 4 in the first quantity sequence with the quantity [3510] of the video frame 4 in the second quantity sequence by the bisection method, to determine that the video Frame 4 is a video frame corresponding to the unmatched audio frame quantity. The video frame 4 is used as a verification video frame. If the video frame 4 meets the predetermined transcoding condition, it is determined that the to-be-transcoded video is successfully transcoded.

It should be noted that, in a case that the last quantity in the first quantity sequence matches the last quantity in the second quantity sequence in the above example, the transcoding video may be successfully or unsuccessfully transcoded. In the case of being unsuccessfully transcoded, it is determined frame by frame whether an audio frame quantity of an audio frame before each video frame of the transcoded video matches an audio frame quantity placed in each video frame of the to-be-transcoded video. If the audio frame quantity of an audio frame before each video frame of the transcoded video is always the same as the audio frame quantity placed in each video frame of the to-be-transcoded video, it is determined that the transcoded video is successfully transcoded.

In the embodiment of the present disclosure, by determining whether the audio frame before the last video frame in the transcoded video matches the audio frame before the last video frame in the to-be-transcoded video, and further determining the video frame corresponding to the unmatched quantity by the predetermined determination method, not only whether the to-be-transcoded video is successfully transcoded can be quickly determined, but also an initial position where the sound and picture non-synchronization exists can be accurately determined, so as to facilitate the subsequent processing for the transcoded video.

It is further determined that the transcoding is successful still by means of the audio frame quantity. Specifically, the process of determining that the to-be-transcoded video is successfully transcoded includes: acquiring a current audio frame quantity of an audio frame before each video frame of the transcoded video; and determining that the transcoding of the to-be-transcoded video is successful in a case that the current audio frame quantity is the same as the audio frame quantity placed in each video frame of the transcoded video.

In an implementation, for the transcoded video, the current audio frame quantity of an audio frame before each video frame of the transcoded video is acquired. It should be noted that during the transcoding process of the transcoding system, the audio frame may be lost or duplicated. In this case, if an audio frame quantity of an audio frame before each video frame of the transcoded video after the transcoding is inconsistent with an audio frame quantity of an audio frame before the corresponding video frame before the transcoding, the sound and picture non-synchronization exists in the transcoded video, so that the user has a poor experience of watching the video. Further, if the current audio frame quantity is the same as the audio frame quantity placed in each video frame of the transcoded video, it is determined that the transcoding of the to-be-transcoded video is successful.

For example, after the video transcoding system transcodes the to-be-transcoded video, and a transcoded video is obtained, and a current audio frame quantity of an audio frame before a video frame of the transcoded video, that is obtained by the predetermined audio frame extraction tool, is 3501. If the audio frame quantity placed in the video frame of the transcoded video is 3506, it is determined that audio frame loss may occur in the transcoded video after the transcoding, and the to-be-transcoded video is unsuccessfully transcoded. If the audio frame quantity placed in the video frame of the transcoded video is 3501, that is, if the audio frame quantity placed in the video frame of the transcoded video is the same as the current audio frame quantity, it is determined that the to-be-transcoded video is successfully transcoded.

In the embodiment of the present disclosure, by acquiring the current audio frame quantity of the audio frame before each video frame of the transcoded video and comparing the current audio frame quantity with the audio frame quantity placed in each video frame of the transcoded video, it can be quickly and accurately determined, based on the comparison result, whether the transcoding result of the to-be-transcoded video is correct, improving the user experience.

In order to better restore the video transcoding system, an audio frame loss degree of the transcoded video is determined according to the current audio frame quantity of the audio frame before each video frame of the transcoded video and the audio frame quantity placed in the each video frame of the transcoded video. Specifically, after acquiring the current audio frame quantity of the audio frame before each video frame of the transcoded video, the video processing method further includes: in a case that the current audio frame quantity is not the same as the audio frame quantity placed in each video frame of the transcoded video, acquiring an actual audio frame quantity of a video frame corresponding to an unmatched quantity in the first quantity sequence and the second quantity sequence, and acquiring an audio frame quantity placed in the video frame; and determining an audio frame loss degree of the transcoded video based on an audio frame duration of each frame of the transcoded video and a difference between the actual audio frame quantity and the audio frame quantity placed in the video frame.

The audio frame loss degree is used for indicating a frame loss degree of the video transcoding system with respect to the sound and picture non-synchronization of the transcoded video. For example, the frame loss rate or the frame drop rate of the audio frame in the transcoded video after the transcoding is high, it can be determined that the audio frame loss degree of the transcoded video is high.

Specifically, in a case that the current audio frame quantity of the audio frame before each video frame of the transcoded video is not the same as the audio frame quantity placed in each video frame of the transcoded video, an actual audio frame quantity of a video frame corresponding to an unmatched quantity in the first quantity sequence and the second quantity sequence, and an audio frame quantity placed in the video frame are acquired. Next, a difference between the actual audio frame quantity and the audio frame quantity placed in the video frame is multiplied by an audio frame duration of each frame of the transcoded video, to determine the audio frame loss degree of the transcoded video.

It should be noted that, if the video transcoding system does not change an audio sampling rate during the video transcoding process, a duration of each audio frame determined according to the audio protocol standard is fixed. The audio protocol standard may be an AAC audio protocol standard.

For example, the audio frame quantity of the audio frame before a third video frame before the transcoding is 10, the actual audio frame quantity of the audio frame before the third video frame after the transcoding is 5, and the audio frame duration of each frame of the transcoded video is 2 ms, In this case, it is determined that the audio frame loss degree of the transcoded video is (10-5)*2 ms, that is, the audio frame loss degree is 10.

In the embodiment of the present disclosure, by determining the audio frame loss degree of the transcoded video, a transcoded audio frame loss degree of the video transcoding system can be further quickly determined, so as to facilitate subsequent restoring of the video transcoding system and give the user a great video experience.

In summary, an audio frame quantity of an audio frame before each video frame before transcoding is placed in the corresponding video frame to determine whether an actual audio frame quantity in each video frame of a video obtained after transcoding is the same as the audio frame quantity placed in each video frame, so that it can be quickly and accurately determined whether the sound and picture non-synchronization exists in the video obtained after the transcoding, to automatically determine whether the video transcoding system has transcoding quality problems, so as to facilitate subsequent processing for the sound and picture non-synchronization.

Figure 8:
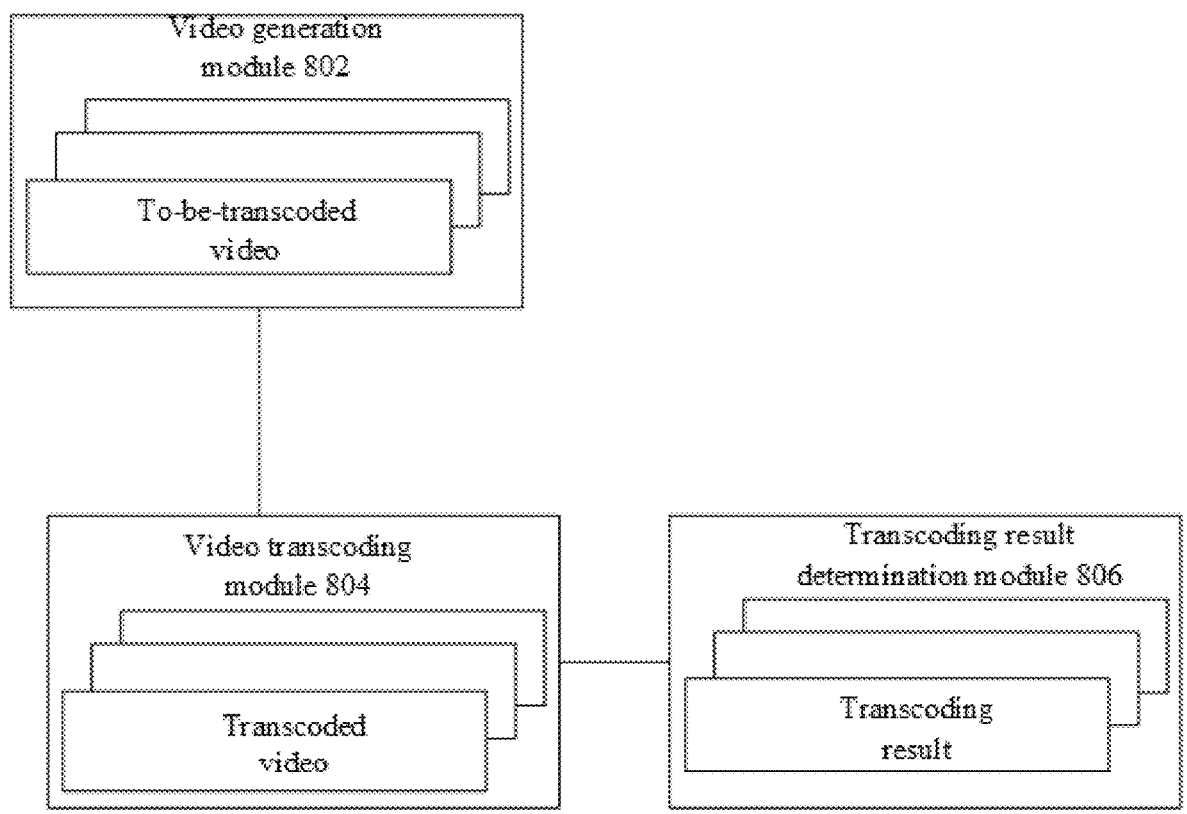
FIG. 8 is a schematic structural diagram of a video processing device according to an embodiment of the present disclosure.

Corresponding to the above method embodiments, embodiments of a video processing device are further provided in the present disclosure. FIG. 5 shows a schematic structural diagram of a video processing device according to an embodiment of the present disclosure. As shown in FIG. 8, the video processing device includes: a video generation module 802, a video transcoding module 804, and a transcoding result determination module 806.

The video generation module 802 is configured to: determine an audio frame quantity of an audio frame before each video frame of an initial video, and place the audio frame quantity of an audio frame before each video frame in a corresponding video frame to generate a to-be-transcoded video.

The video transcoding module 804 is configured to: send the to-be-transcoded video to a predetermined video transcoding system for video transcoding, and receive a transcoded video returned by the video transcoding system.

The transcoding result determination module 806 is configured to: acquire an audio frame quantity placed in each video frame of the transcoded video, and determine a transcoding result of the to-be-transcoded video based on the audio frame quantity placed in each video frame of the transcoded video.

In an embodiment, the transcoding result determination module 806 is further configured to: arrange, frame by frame, the audio frame quantity placed in each video frame of the to-be-transcoded video to form a first quantity sequence, and arrange, frame by frame, the audio frame quantity placed in each video frame of the transcoded video to form a second quantity sequence; compare the first quantity sequence with the second quantity sequence; and determine that the to-be-transcoded video is successfully transcoded in a case that the first quantity sequence fully matches the second quantity sequence.

In an embodiment, the transcoding result determination module 806 is further configured to: acquire a current audio frame quantity of an audio frame before each video frame of the transcoded video; and determine that the to-be-transcoded video is successfully transcoded in a case that the current audio frame quantity is the same as the audio frame quantity placed in each video frame of the transcoded video.

In an embodiment, the transcoding result determination module 806 is further configured to: in a case that the first quantity sequence does not match the second quantity sequence, determine a video frame corresponding to an unmatched quantity in the first quantity sequence and the second quantity sequence, as a verification video frame; and in a case that the verification video frame meets a predetermined transcoding condition, determine that the to-be-transcoded video is successfully transcoded.

In an embodiment, the transcoding result determination module 806 is further configured to: in a case that a last quantity in the first quantity sequence does not match a last quantity in the second quantity sequence, determine a video frame corresponding to an unmatched quantity in the first quantity sequence and the second quantity sequence by a predetermined determination method; determine the video frame corresponding to the unmatched quantity in the first quantity sequence and the second quantity sequence, as a verification video frame; and in a case that the verification video frame meets a predetermined transcoding condition, determine that the to-be-transcoded video is successfully transcoded.

In an embodiment, the video processing device further includes an acquisition module. The acquisition module is configured to: acquire a current audio frame quantity of an audio frame before each video frame of the transcoded video. In a case that the current audio frame quantity is the same as the audio frame quantity placed in each video frame of the transcoded video, it is determined that the to-be-transcoded video is successfully transcoded.

In an embodiment, the transcoding result determination module 806 is further configured to: in a case that the current audio frame quantity is not the same as the audio frame quantity placed in each video frame of the transcoded video, acquire an actual audio frame quantity of a video frame corresponding to an unmatched quantity in the first quantity sequence and the second quantity sequence, and acquire an audio frame quantity placed in the video frame; and determine an audio frame loss degree of the transcoded video based on an audio frame duration of each frame of the transcoded video and a difference between the actual audio frame quantity and the audio frame quantity placed in the video frame.

In an embodiment, the video processing device further includes: an acquisition module. The acquisition module is configured to: acquire the initial video, and determine the audio frame quantity of the audio frame before each video frame of the initial video by a predetermined audio frame extraction tool.

In an embodiment, the video generation module 802 is further configured to:

place the audio frame quantity of the audio frame before each video frame at a predetermined position in the corresponding video frame by a watermarking technology to generate the to-be-transcoded video.

With the video processing device according to the embodiments of the present disclosure, an audio frame quantity of an audio frame before each video frame before transcoding is placed in the corresponding video frame to determine whether an actual audio frame quantity in each video frame of a video obtained after transcoding is the same as the audio frame quantity placed in each video frame, so that it can be quickly and accurately determined whether the sound and picture non-synchronization exists in the video obtained after the transcoding, so as to facilitate subsequent processing for the sound and picture non-synchronization.

Figure 9:
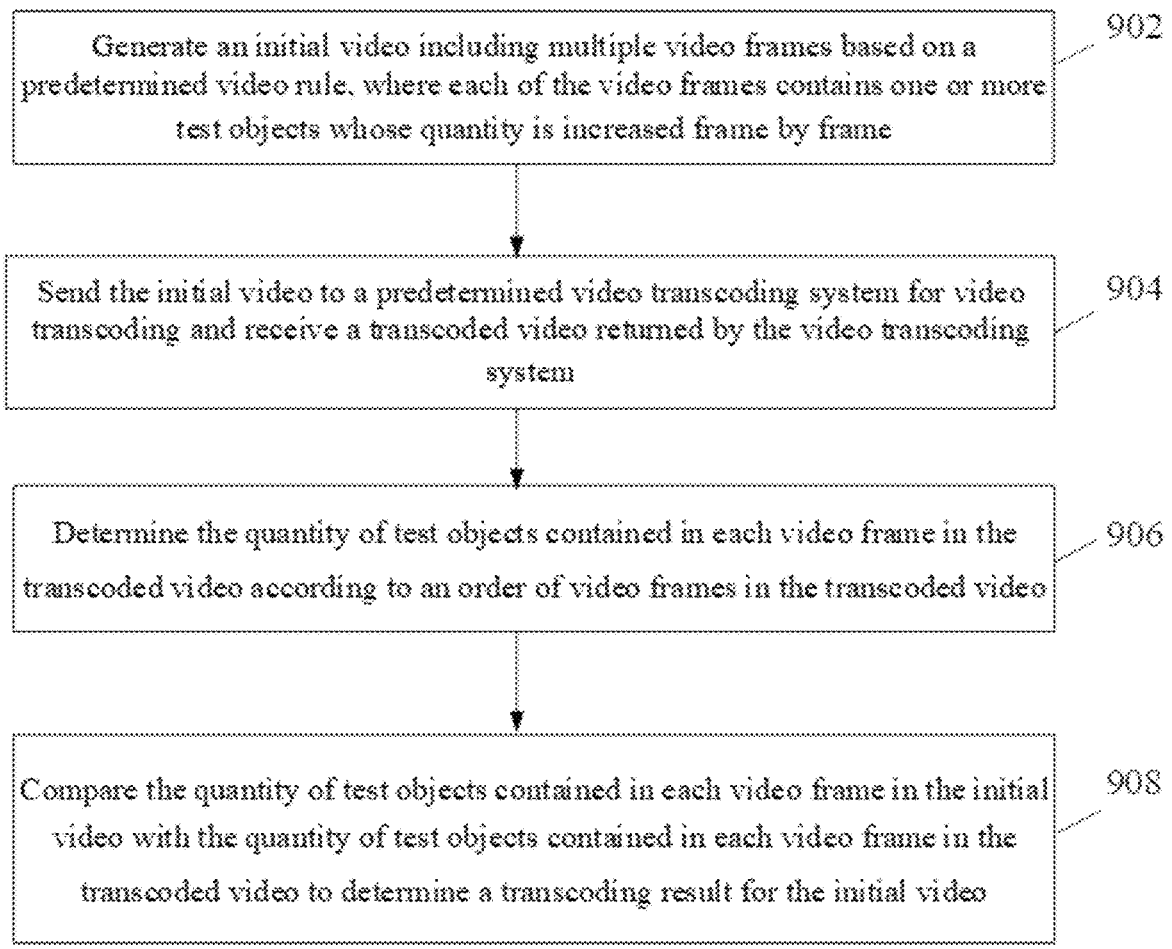
FIG. 9 is a flowchart of a video processing method according to an embodiment of the present disclosure.

Reference is made to FIG. 9, which is a flowchart of a video processing method according to an embodiment of the present disclosure. The video processing method includes the following steps 902 to 908.

In step 902, an initial video including multiple video frames is generated based on a predetermined video rule, where each of the video frames contains one or more test objects whose quantity is increased frame by frame.

The video processing method according to the embodiment of the present disclosure is applied to a scenario in which a quality of a video transcoding system is tested. Firstly, a special initial video is generated based on a user requirement. Then, the generated initial video is inputted into the video transcoding system whose quality is to be tested. The initial video before transcoding is compared with a transcoded video after transcoding to determine whether there is a difference between the initial video before transcoding and the transcoded video after transcoding, so as to determine whether the video transcoding system has transcoding quality problems. For example, if there is no difference between the initial video before transcoding and the transcoded video after transcoding, it is indicated that the video transcoding system has no transcoding quality problem and the transcoding is successful. In addition, if there is a difference between the initial video before transcoding and the transcoded video after transcoding, it is indicated that the video transcoding system has transcoding quality problems such as frame loss or frame drop. In this case, the video transcoding system is required to be restored.

The predetermined video rule may be understood as a user requirement. For example, the user requirement is that an initial video that includes multiple video frames with a base image in white is generated, or that an initial video that includes multiple video frames with a base image in black is generated. In an implementation, the predetermined video rule may be set according to actual applications, which is not limited in the present disclosure.

Specifically, the process of generating the initial video including multiple video frames based on the predetermined video rule is performed by the following operations of: generating, based on the predetermined video rule, an initial video including multiple video frames each of which is composed of a base image having a first pixel and test objects having a second pixel, where a similarity between the first pixel and the second pixel is less than or equal to a predetermined similarity threshold.

A pixel value of the first pixel is different from a pixel value of the second pixel, and a similarity between the pixel value of the first pixel and the pixel value of the second pixel is less than or equal to the predetermined similarity threshold. It can be understood that, if the first pixel is white, the second pixel is black, purple, green, or the like, having a large contrast with the white first pixel.

For example, if the first pixel is white and the second pixel is black, the process of generating, based on the predetermined video rule, the initial video including multiple video frames each of which is composed of a base image having the first pixel and test objects having the second pixel may be understood as a process of generating, based on the predetermined video rule, an initial video including multiple video frames each of which composed of a white base image and black test objects.

The test object includes, but is not limited to, any shape of test block, such as a square, round, or rectangular black test block.

Figure 10:
FIG. 10 is a schematic diagram showing a video frame of an initial video in a video processing method according to an embodiment of the present disclosure.

Reference is made to FIG. 10, which is a schematic diagram showing a video frame of an initial video in a video processing method according to an embodiment of the present disclosure.

FIG. 10 is a schematic diagram of a video frame in the initial video. The video frame is composed of a white base image and a black rectangular test block. The black rectangular test block is the above-mentioned test object.

In the embodiment of the present disclosure, a video frame is generated by a base image and a test object that have a large pixel contrast therebetween, and multiple such video frames form an initial video. In this way, when performing statistics on the quantity of test objects in each video frame of the initial video, the test objects with large color contrast in each video frame can be conveniently and quickly extracted, avoiding that when the colors of the test object and the base image are similar, the outline of the test object cannot be accurately found, and the test object cannot be accurately acquired.

In an implementation, the initial video generated based on the predetermined video rule includes multiple video frames, each video frame is composed of a base image and a test object that have a large color contrast therebetween, and the quantity of test objects in each video frame is increased linearly. For example, the initial video includes three video frames, which are respectively a video frame 1, a video frame 2, and a video frame 3. The video frame 1 includes 10 test objects, the video frame 2 includes 11 test objects, and the video frame 3 includes 12 test objects. That is, the quantity of test objects contained in each video frame of the initial video is increased frame by frame according to an order of the video frames in the initial video.

Figure 11:
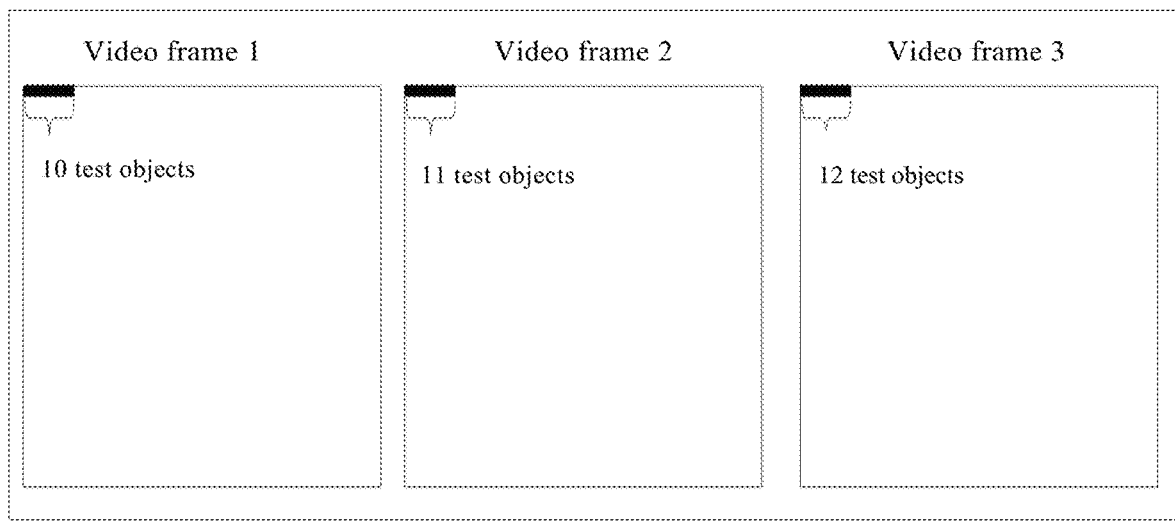
FIG. 11 is a schematic diagram showing multiple video frames of an initial video in a video processing method according to an embodiment of the present disclosure.

Reference is made to FIG. 11, which is a schematic diagram showing multiple video frames of an initial video in a video processing method according to an embodiment of the present disclosure.

The initial video shown in FIG. 11 includes a video frame 1, a video frame 2, and a video frame 3. The video frame 1 includes 10 test objects, the video frame 2 includes 11 test objects, and the video frame 3 includes 12 test objects.

Specifically, in order to facilitate the extraction of test objects in each video frame, the test objects in different video frames can be uniformly arranged at a same fixed position of the video frames. In the actual applications, the test objects in different video frames may also be arranged at different positions of the video frames. For example, the test objects in the video frame 1 are arranged at the upper left corner of the video frame 1, and the test objects in the video frame 2 are arranged at the upper right corner of the video frame 2, and the test objects in video frame 3 are arranged at the middle of the video frame 3.

Specifically, after the initial video including multiple video frames is generated based on the predetermined video rule, the video processing method further includes: setting a quantity display area for displaying the quantity of test objects at a predetermined position of each video frame of the initial video; and placing the quantity of test objects contained in each video frame of the initial video in the quantity display area.

The quantity display area may be understood as a digital watermark set at a predetermined position of each video frame of the initial video. The purpose of using the digital watermark is to facilitate people to recognize and watch the quantity of test objects contained in each video frame, which is different from the purpose of setting test objects in each video frame. The test objects contained in each video frame are used to facilitate machine recognition and statistics. In an implementation, since the color of the test object is represented by a digital pixel, the computer can directly count the quantity of second pixels (such as black pixels) contained in each video frame, to obtain the quantity of test objects in each video frame.

In practical applications, in order to conveniently obtain the quantity of test objects in each video frame of the initial video, a quantity display area for displaying the quantity of test objects may be set at a predetermined position of each video frame of the initial video, and the quantity of test objects contained in each video frame of the initial video is displayed in the quantity display area. The predetermined position may be any position of each video frame, for example, four corners or the middle area of the video frame. In order to prevent the quantity display area from occluding the test object, the test object and the quantity display area may be set in different positions of each video frame. For example, the test object is arranged at the upper left corner of the video frame, and the quantity display area is set at the upper right corner of the video frame.

The quantity of test objects contained in each video frame of the initial video is placed in the quantity display area. Following the above example, the quantity of test objects contained in the video frame 1, i.e., 10, is placed in the quantity display area of the video frame 1. The quantity of test objects contained in the video frame 2, i.e., 11, is placed in the quantity display area of the video frame 2. The quantity of test objects contained in the video frame 3, i.e., 12, is placed in the quantity display area of the video frame 3.

Figure 12:
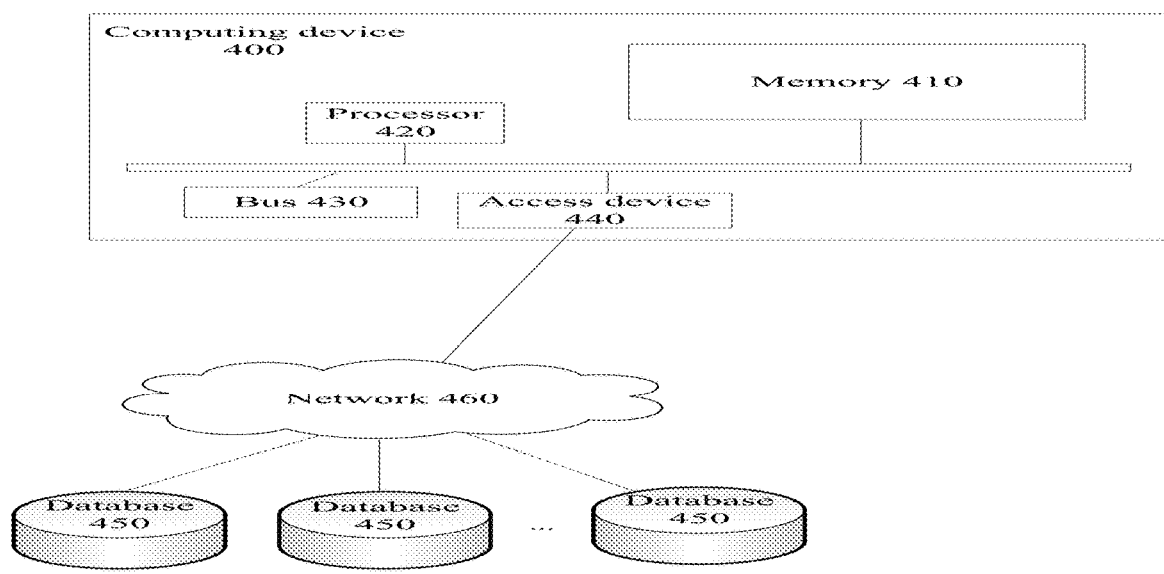
FIG. 12 is a schematic diagram showing a quantity display area in each video frame of an initial video in a video processing method according to an embodiment of the present disclosure.

Reference is made to FIG. 12, which is a schematic diagram showing a quantity display area in each video frame of an initial video in a video processing method according to an embodiment of the present disclosure.

The initial video shown in FIG. 12 includes a video frame 1, a video frame 2, and a video frame 3. The video frame 1 includes 10 test objects, the video frame 2 includes 11 test objects, and the video frame 3 includes 12 test objects.

The test objects of each video frame are arranged at the upper left corner of the video frame, and a quantity display area is set at the upper right corner of each video frame to display the quantity of test objects contained in the video frame. That is, the quantity of test objects contained in the video frame 1, i.e., 10, is placed in the quantity display area at the upper right corner of the video frame 1. The quantity of test objects contained in the video frame 2, i.e., 11, is placed in the quantity display area at the upper right corner of the video frame 2. The quantity of test objects contained in the video frame 3, i.e., 12, is placed in the quantity display area at the upper right corner of the video frame 3.

In the embodiment of the present disclosure, in order to more conveniently determine the quantity of test objects contained in each video frame in the initial video, a quantity display area for displaying the quantity of test objects is set in each video frame of the initial video, and the quantity of test objects contained in each video frame of the initial video is placed and displayed in the corresponding quantity display area.

In step 904, the initial video is sent to a predetermined video transcoding system for video transcoding, and a transcoded video returned by the video transcoding system is received.

The predetermined video transcoding system includes any video transcoding system whose transcoding quality is to be tested.

Specifically, after the initial video including multiple video frames is generated, the initial video is sent to a specific video transcoding system whose transcoding quality is to be tested, for video transcoding. A transcoded video that is generated after the initial video is transcoded and returned by the video transcoding system is received.

In an implementation, after the process of sending the initial video to the predetermined video transcoding system for video transcoding and receiving the transcoded video returned by the video transcoding system, the video processing method further includes: recognizing the quantity of test objects displayed in the quantity display area of each video frame in the transcoded video by a predetermined recognition algorithm.

In practical applications, the quantity display area of each video frame of the initial video carries the quantity of test objects contained in the video frame, and during the transcoding process, the quantity display area and the quantity of test objects placed in the quantity display area are generally not lost or garbled due to transcoding. In this way, each video frame of the transcoded video after the transcoding also has a quantity display area, and each quantity display area contains the quantity of test objects.

Therefore, after obtaining the transcoded video, a predetermined recognition algorithm (such as an OCR recognition algorithm) may be used to recognize the quantity of test objects displayed in the quantity display area for each video frame in the transcoded video.

In the embodiment of the present disclosure, the quantity of test objects displayed in the quantity display area for each video frame in the transcoded video is recognized by means of the recognition algorithm, and the quantity of test objects displayed in the quantity display area for each video frame in the transcoded video is compared with the quantity of test objects displayed in the quantity display area for each video frame of the initial video, so as to accurately determine whether the transcoded video formed by transcoding the initial video has the problems of frame loss or frame drop.

In step 906, the quantity of test objects contained in each video frame in the transcoded video is determined according to an order of video frames in the transcoded video.

Specifically, after the transcoded video is obtained, the quantity of test objects contained in each video frame in the transcoded video is determined according to the order of the video frames in the transcoded video.

In an implementation, after obtaining the transcoded video, the quantity of test objects contained in each video frame is counted by a computer according to the order of the video frames in the transcoded video, rather than recognizing the quantity of test objects in the quantity display area in each video frame in the transcoded video by the recognition algorithm.

Since the frame loss or frame drop may exist in the transcoding process for the initial video, the video frames in the transcoded video obtained after the transcoding may appear out of order. In this case, the quantity of test objects contained in each video frame of the transcoded video is counted to facilitate the subsequent comparison.

In step 908, the quantity of test objects contained in each video frame in the initial video is compared with the quantity of test objects contained in each video frame in the transcoded video to determine a transcoding result for the initial video.

The process of comparing the quantity of test objects contained in each video frame in the initial video with the quantity of test objects contained in each video frame in the transcoded video to determine the transcoding result for the initial video may be implemented at least in two manners. In a first manner, the quantity of test objects counted by the computer is compared between the initial video and the transcoded video. In a second manner, the quantity of test objects displayed in the quantity display area of each video frame is directly compared between the initial video and the transcoded video, which is performed as follows.

The processing of comparing the quantity of test objects contained in each video frame in the initial video with the quantity of test objects contained in each video frame in the transcoded video to determine the transcoding result for the initial video is performed by performing the following operations of: arranging, frame by frame, the quantity of test objects contained in each video frame in the initial video to form a first quantity sequence, and arranging, frame by frame, the quantity of test objects contained in each video frame in the transcoded video to form a second quantity sequence; and comparing the first quantity sequence with the second quantity sequence, and determining that the initial video is successfully transcoded in a case that the first quantity sequence fully matches the second quantity sequence.

Specifically, the quantity of test objects contained in each video frame in the initial video is arranged frame by frame according to an order of all video frames in the initial video to form the first quantity sequence.

Following the above example, the first quantity sequence formed by arranging, frame by frame, the quantity of test objects contained in each video frame in the initial video according to the order of all the video frames in the initial video is [10, 11, 12].

Further, the quantity of test objects contained in each video frame in the transcoded video is arranged frame by frame according to an order of all video frames in the transcoded video to form the second quantity sequence.

For example, the transcoded video still includes three video frames arranged in an order of the video frame 1, the video frame 2, and the video frame 3. In this case, the second quantity sequence formed by arranging, frame by frame, the quantity of test objects contained in each video frame in the transcoded video according to the order of all the video frames in the transcoded video is [10, 11, 12].

By comparing the first quantity sequence with the second quantity sequence, it is determined that the first quantity sequence fully matches the second quantity sequence. In this case, it can be determined that the initial video is successfully transcoded, which indicates that the current video transcoding system has a good transcoding quality.

In the embodiment of the present disclosure, by comparing the counted quantity of test objects contained in each video frame of the initial video with the counted quantity of test objects contained in each video frame of the transcoded video formed after the transcoding, whether the transcoding result for the initial video is correct can be quickly and accurately determined according to the comparison result, improving the user experience.

In practical applications, after the first quantity sequence is compared with the second quantity sequence, the video processing method further includes: in a case that the first quantity sequence does not match the second quantity sequence, determining a video frame corresponding to an unmatched quantity in the first quantity sequence and the second quantity sequence, as a verification video frame; and in a case that the verification video frame meets a predetermined transcoding condition, determining that the initial video is successfully transcoded.

The predetermined transcoding condition is set according to actual applications, which is not limited in the present disclosure. For example, the predetermined transcoding condition is that, the video frame 1 may be repeated or the video frame 2 may be lost during the transcoding process.

Following the above example, the transcoded video includes three video frames arranged in an order of the video frame 1, the video frame 3, and the video frame 2, and the second quantity sequence formed by arranging, frame by frame, the quantity of test objects contained in each video frame in the transcoded video according to the order of all the video frames in the transcoded video is [10, 12, 11]. In this case, the first quantity sequence [10, 11, 12] does not match the second quantity sequence [10, 12, 11], and it is determined that the unmatched quantity in the first quantity sequence and the second quantity sequence is 11, and the video frame corresponding to the unmatched quantity is the video frame 2 in the initial video, which is determined as the verification video frame.

If the predetermined transcoding condition is that the video frame 2 is required to be lost during the video transcoding process, it can be determined according to the predetermined transcoding condition that the verification video frame meets the predetermined transcoding condition, which indicates that the initial video is successfully transcoded.

The embodiments of the present disclosure may be applied to various video transcoding scenarios. In some special video transcoding scenarios, the frame loss or the frame drop is allowed during the video transcoding process, to achieve video special effects or other requirements. Therefore, in the case that the first quantity sequence does not match the second quantity sequence, it is required to verify, based on the predetermined transcoding condition in a specific application scenario, whether the initial video is successfully transcoded, so as to expand application scenarios of the video processing method provided in the present disclosure and improve the user experience.

Further, after the first quantity sequence is compared with the second quantity sequence, the video processing method further includes: in the case that the first quantity sequence does not match the second quantity sequence, determining that the initial video is unsuccessfully transcoded, and parsing the transcoded video based on the video frame corresponding to the unmatched quantity in the first quantity sequence and the second quantity sequence to restore the video transcoding system.

Further, in a case that the verification video frame does not meet the predetermined transcoding condition, the transcoded video is parsed based on the verification video frame to restore the video transcoding system.

Following the above example, the transcoded video still includes three video frames arranged in an order of the video frame 1, the video frame 3, and the video frame 2, and the second quantity sequence formed by arranging, frame by frame, the quantity of test objects contained in each video frame in the transcoded video according to the order of all the video frames in the transcoded video is [10, 12, 11].

By comparing the first quantity sequence with the second quantity sequence, it is determined that the first quantity sequence do not match the second quantity sequence. In this case, it can be determined that the initial video is unsuccessfully transcoded, that is, the order between the video frame 2 and the video frame 3 after the transcoding is disordered, indicating that the transcoding quality of the current video transcoding system is not very good, and the video transcoding system is required to be restored later. Furthermore, a problematic video frame can be quickly located based on the unmatched quantity. When restoring the video transcoding system, the problem can be analyzed based on the problematic video frame.

In another case, it is assumed that the transcoded video still includes three video frames arranged in an order of the video frame 1, the video frame 3, and the video frame 2, and the second quantity sequence formed by arranging, frame by frame, the quantity of test objects contained in each video frame in the transcoded video according to the order of all the video frames in the transcoded video is [10, 10, 11].

By comparing first quantity sequence with the second quantity sequence, it is determined that the first quantity sequence do not match the second quantity sequence. In this case, it can be determined that the initial video is unsuccessfully transcoded, that is, the video frame 2 after the transcoding is lost, and the video frame 1 is repeated. This situation of repeated transcoding of the video frame is different from the situation in the video transcoding where the quantity of video frames is disordered. In this case, when the transcoded video is played, not only the correlation between adjacent video pictures is poor, but also a feeling of stuttering may appear due to the repeated video frames. Therefore, in this case, the video transcoding system is also required to be restored. Furthermore, a problematic video frame can be quickly located based on the unmatched quantity. When restoring the video transcoding system, the problem can be analyzed based on the problematic video frame.

Still following the above example, in actual applications, the transcoded video obtained after the initial video is transcoded may include, for example, four video frames, one of which is repeatedly transcoded (i.e., frame drop), or the transcoded video may include two video frames, one of which is lost. In these cases, the obtained second quantity sequence does not match the first quantity sequence.

In the embodiment of the present disclosure, by comparing the counted quantity of test objects contained in each video frame of the initial video with the counted quantity of test objects contained in each video frame of the transcoded video formed after the transcoding, whether the transcoding result for the initial video is correct can be can quickly and accurately determined according to the comparison result. In a case that the transcoding result for the initial video is inaccurate, it is determined whether frame loss or frame drop exists in the transcoded video by parsing the transcoded video, and the video transcoding system is restored in a targeted manner based on the determination result.

In another case, the process of comparing the quantity of test objects contained in each video frame in the initial video with the quantity of test objects contained in each video frame in the transcoded video to determine the transcoding result for the initial video is performed by performing the following operations of: arranging, frame by frame, the quantity of test objects displayed in the quantity display area of each video frame in the initial video to form a third quantity sequence, and arranging, frame by frame, the quantity of test objects displayed in the quantity display area of each video frame in the transcoded video to form a fourth quantity sequence; and comparing the third quantity sequence with the fourth quantity sequence, and determining that the initial video is successfully transcoded in a case that the third quantity sequence fully matches the fourth quantity sequence.

Specifically, the quantity of test objects displayed in the quantity display area of each video frame in the initial video is arranged frame by frame according to an order of all video frames in the initial video to form the third quantity sequence.

Following the above example, the third quantity sequence formed by arranging, frame by frame, the quantity of test objects displayed in the quantity display area of each video frame in the initial video according to the order of all the video frames in the initial video is [10, 11, 12].

The quantity of test objects displayed in the quantity display area of each video frame in the transcoded video is arranged frame by frame according to an order of all video frames in the transcoded video to form the fourth quantity sequence.

For example, the transcoded video still includes three video frames arranged in an order of the video frame 1, the video frame 2, and the video frame 3. In this case, the fourth quantity sequence formed by arranging, frame by frame, the quantity of test objects displayed in the quantity display area of each video frame in the transcoded video according to the order of all the video frames in the transcoded video is [10, 11, 12].

By comparing the third quantity sequence with the fourth quantity sequence, it is determined that the third quantity sequence fully matches the fourth quantity sequence. In this case, it can be determined that the initial video is successfully transcoded, which indicates that the current video transcoding system has a good transcoding quality.

In the embodiment of the present disclosure, by comparing the counted quantity of test objects displayed in the quantity display area of each video frame in the initial video with the counted quantity of test objects displayed in the quantity display area of each video frame in the transcoded video formed after the transcoding, whether the transcoding result for the initial video is correct can be quickly and accurately determined according to the comparison result, improving the user experience.

In practical applications, after the third quantity sequence is compared with the fourth quantity sequence, the video processing method further includes: in a case that the third quantity sequence does not match the fourth quantity sequence, determining a video frame corresponding to an unmatched quantity in the third quantity sequence and the fourth quantity sequence, as a verification video frame; and in a case that the verification video frame meets a predetermined transcoding condition, determining that the initial video is successfully transcoded.

The predetermined transcoding condition is set is set according to actual applications, which is not limited in the present disclosure. For example, the predetermined transcoding condition is that, the video frame 1 may be repeated or the video frame 2 may be lost during the transcoding process.

Following the above example, the transcoded video includes two video frames arranged in an order of the video frame 1 and the video frame 3, and the fourth quantity sequence formed by arranging, frame by frame, the quantity of test objects displayed in the quantity display area of each video frame in the transcoded video according to the order of all the video frames in the transcoded video is [10, 12]. In this case, the third quantity sequence [10, 11, 12] does not match the fourth quantity sequence [10, 12], and it is determined that the unmatched quantity in the third quantity sequence and the fourth quantity sequence is 11, and the video frame corresponding to the unmatched quantity is the video frame 2 in the initial video, which is determined as is the verification video frame.

If the predetermined transcoding condition is that the video frame 2 is required to be lost during the video transcoding process, it can be determined according to the predetermined transcoding condition that the verification video frame meets the predetermined transcoding condition, which indicates that the initial video is successfully transcoded.

The embodiments of the present disclosure may be applied to various video transcoding scenarios. In some special video transcoding scenarios, the frame loss or the frame drop is allowed during the video transcoding process, to achieve video special effects or other requirements. Therefore, in the case that the third quantity sequence does not match the fourth quantity sequence, it is required to verify, based on the predetermined transcoding condition in a specific application scenario, whether the initial video is successfully transcoded, so as to expand application scenarios of the video processing method provided in the present disclosure and improve the user experience.

Further, after the third quantity sequence is compared with the fourth quantity sequence, the video processing method further includes: in the case that the third quantity sequence does not match the fourth quantity sequence, determining that the initial video is unsuccessfully transcoded, and parsing the transcoded video based on the video frame corresponding to the unmatched quantity in the third quantity sequence and the fourth quantity sequence to restore the video transcoding system.

Further, in a case that the verification video frame does not meet the predetermined transcoding condition, the transcoded video is parsed based on the verification video frame to restore the video transcoding system.

Following the above example, the transcoded video still includes three video frames arranged in an order of the video frame 1, the video frame 3, and the video frame 2, and the fourth quantity sequence formed by arranging, frame by frame, the quantity of test objects displayed in the quantity display area corresponding to each video frame of the transcoded video according to the order of all the video frames in the transcoded video is [10, 12, 11].

By comparing the third quantity sequence with the fourth quantity sequence, it is determined that the third quantity sequence do not match the fourth quantity sequence. In this case, it can be determined that the initial video is unsuccessfully transcoded, that is, the order between the video frame 2 and the video frame 3 after the transcoding is disordered, indicating that the transcoding quality of the current video transcoding system is not very good, and the video transcoding system is required to be restored later. Furthermore, a problematic video frame can be quickly located based on the unmatched quantity. When restoring the video transcoding system, the problem can be analyzed based on the problematic video frame.

In practical applications, the transcoded video obtained after the initial video is transcoded may include, for example, four video frames, one of which is repeatedly transcoded. In this case, the fourth quantity sequence has 4 elements. For another example, the transcoded video may include two video frames, one of which is lost. In this case, the fourth quantity sequence has 2 elements. In these cases, the obtained fourth quantity sequence does not match the third quantity sequence.

In the embodiment of the present disclosure, by comparing the quantity of test objects displayed in the quantity display area corresponding to each video frame of the initial video with the recognized quantity of test objects displayed in the quantity display area corresponding to each video frame of the transcoded video formed after the transcoding based on the predetermined recognition algorithm, whether the transcoding result for the initial video is correct can be can quickly and accurately determined according to the comparison result. In a case that the transcoding result for the initial video is inaccurate, it is determined whether frame loss or frame drop exists in the transcoded video by parsing the transcoded video, and the video transcoding system is restored in a targeted manner based on the determination result.

In another embodiment of the present disclosure, the process of comparing the quantity of test objects contained in each video frame in the initial video with the quantity of test objects contained in each video frame in the transcoded video to determine the transcoding result for the initial video is performed by performing the following operations of:

arranging, frame by frame, the quantity of test objects contained in each video frame in the initial video to form a first quantity sequence, and arranging, frame by frame, the quantity of test objects contained in each video frame in the transcoded video to form a second quantity sequence; arranging, frame by frame, the quantity of test objects displayed in the quantity display area of each video frame in the initial video to form a third quantity sequence, and arranging, frame by frame, the quantity of test objects displayed in the quantity display area of each video frame in the transcoded video to form a fourth quantity sequence; comparing the first quantity sequence with the second quantity sequence, and comparing the third quantity sequence with the fourth quantity sequence; and determining that the initial video is successfully transcoded in a case that the first quantity sequence fully matches the second quantity sequence or the third quantity sequence fully matches the fourth quantity sequence.

In practical applications, during the transcoding process for the initial video, the test object may be lost or the quantity of test objects in the quantity display area may be lost, and the possibility of both being lost is small. Therefore, not only the quantity of test objects before transcoding is compared with that after the transcoding, but also the quantity of test objects in the quantity display area before the transcoding is compared with that after the transcoding. In a case that any one of the quantity of test objects, and the quantity of test objects in the quantity display area matches, it is indicated that the initial video is successfully transcoded. In addition, neither the quantity of test objects nor the quantity of test objects in the quantity display area matches, it is indicated that the initial video is unsuccessfully transcoded.

In a specific implementation, for the acquisition of the first quantity sequence, the second quantity sequence, the third quantity sequence, and the fourth quantity sequence, and the comparison therebetween, reference may be made to the above-mentioned embodiments, which is not repeated herein.

In the embodiments of the present disclosure, in order to ensure the accuracy of the transcoding result for the initial video, the quantities of two types of test objects are compared. In a case that any one of the comparison results matches, it can be determined that the transcoding result of the initial video is successful and the video transcoding system has no transcoding quality problems. In this way, whether the video transcoding system has transcoding quality problems can be automatically determined according to the difference between the video before the transcoding and that after transcoding, improving the user experience.

Figure 13:
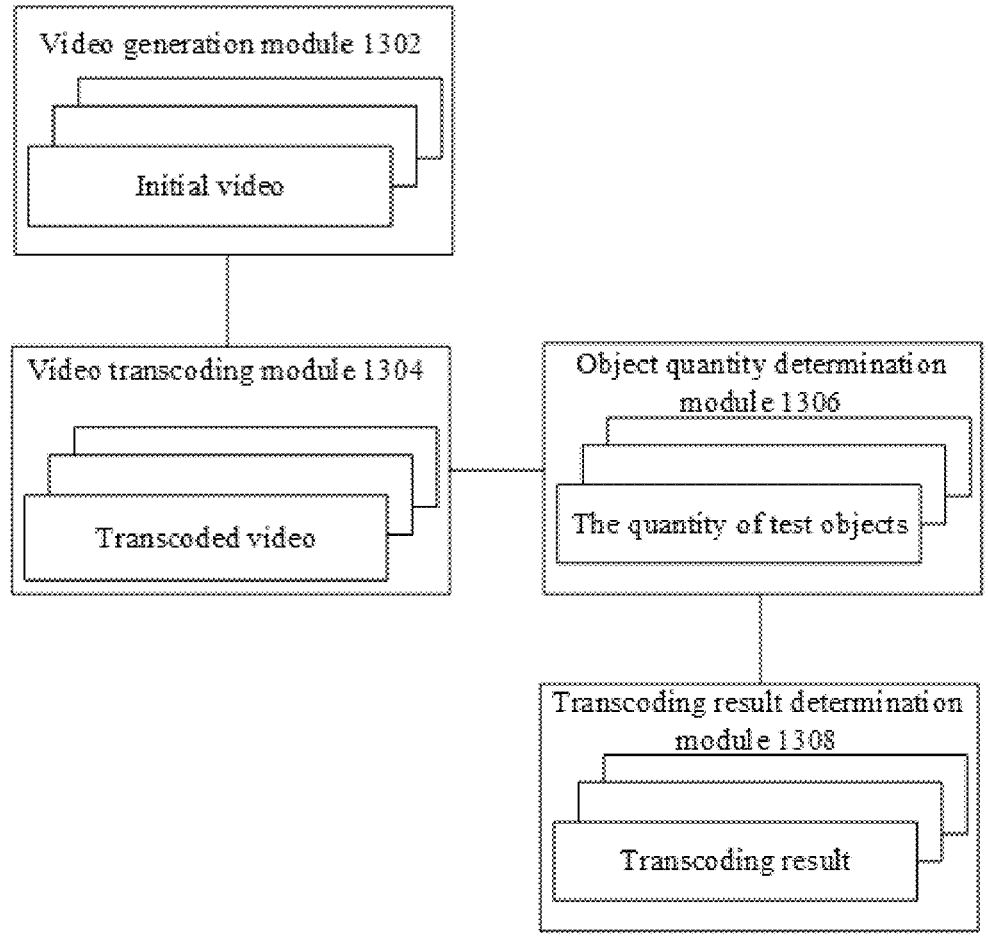
FIG. 13 is a schematic structural diagram of a video processing device according to an embodiment of the present disclosure.

Corresponding to the above method embodiments, embodiments of a video processing device are further provided in the present disclosure. FIG. 13 shows a schematic structural diagram of a video processing device according to an embodiment of the present disclosure. As shown in FIG. 13, the video processing device includes: a video generation module 1302, a video transcoding module 1304, an object quantity determination module 1306, and a transcoding result determination module 1308.

The video generation module 1302 is configured to generate an initial video including multiple video frames based on a predetermined video rule, where each of the video frames contains one or more test objects whose quantity is increased frame by frame.

The video transcoding module 1304 is configured to send the initial video to a predetermined video transcoding system for video transcoding and receive a transcoded video returned by the video transcoding system.

The object quantity determination module 1306 is configured to determine the quantity of test objects contained in each video frame in the transcoded video according to an order of video frames in the transcoded video.

The transcoding result determination module 1308 is configured to compare the quantity of test objects contained in each video frame in the initial video with the quantity of test objects contained in each video frame in the transcoded video to determine a transcoding result for the initial video.

In an embodiment, the video processing device further includes: a quantity display module. The quantity display module is configured to: set a quantity display area for displaying the quantity of test objects at a predetermined position of each video frame of the initial video; and place the quantity of test objects contained in each video frame of the initial video in the quantity display area.

In an embodiment, the video processing device further includes a quantity recognition module. The quantity recognition module is configured to recognize the quantity of test objects displayed in the quantity display area of each video frame in the transcoded video by a predetermined recognition algorithm.

In an embodiment, the transcoding result determination module 1308 is configured to: arrange, frame by frame, the quantity of test objects contained in each video frame in the initial video to form a first quantity sequence, and arranging, frame by frame, the quantity of test objects contained in each video frame in the transcoded video to form a second quantity sequence; and compare the first quantity sequence with the second quantity sequence, and determining that the initial video is successfully transcoded in a case that the first quantity sequence fully matches the second quantity sequence.

In an embodiment, the transcoding result determination module 1308 is configured to: arrange, frame by frame, the quantity of test objects displayed in the quantity display area of each video frame in the initial video to form a third quantity sequence, and arranging, frame by frame, the quantity of test objects displayed in the quantity display area of each video frame in the transcoded video to form a fourth quantity sequence; and compare the third quantity sequence with the fourth quantity sequence, and determining that the initial video is successfully transcoded in a case that the third quantity sequence fully matches the fourth quantity sequence.

In an embodiment, the video processing device further includes: a first verification module. The first verification module is configured to: in a case that the first quantity sequence does not match the second quantity sequence, determine a video frame corresponding to an unmatched quantity in the first quantity sequence and the second quantity sequence, as a verification video frame; and in a case that the verification video frame meets a predetermined transcoding condition, determine that the initial video is successfully transcoded.

In an embodiment, the video processing device further includes: a first verification module. The first verification module is configured to: in a case that the third quantity sequence does not match the fourth quantity sequence, determine a video frame corresponding to an unmatched quantity in the third quantity sequence and the fourth quantity sequence, as a verification video frame; and in a case that the verification video frame meets a predetermined transcoding condition, determine that the initial video is successfully transcoded.

In an embodiment, the transcoding result determination module 1308 is configured to: arrange, frame by frame, the quantity of test objects contained in each video frame in the initial video to form a first quantity sequence, and arrange, frame by frame, the quantity of test objects contained in each video frame in the transcoded video to form a second quantity sequence; arrange, frame by frame, the quantity of test objects displayed in the quantity display area of each video frame in the initial video to form a third quantity sequence, and arrange, frame by frame, the quantity of test objects displayed in the quantity display area of each video frame in the transcoded video to form a fourth quantity sequence; compare the first quantity sequence with the second quantity sequence, and comparing the third quantity sequence with the fourth quantity sequence; and determine that the initial video is successfully transcoded in a case that the first quantity sequence fully matches the second quantity sequence or the third quantity sequence fully matches the fourth quantity sequence.

In an embodiment, the video generation module 1302 is configured to: generate an initial video including multiple video frames based on the predetermined video rule, where each of the video frames is composed of a base image having a first pixel and test objects having a second pixel, and a similarity between the first pixel and the second pixel is less than or equal to a predetermined similarity threshold.

With the video processing device according to the embodiments of the present disclosure, each video frame of an initial video is set with a test object, and a test object in each video frame of a transcoded video corresponding to the initial video is acquired. According to an order of video frames, it is determined by comparison whether the quantity of test objects in each video frame of the initial video is the same as the quantity of test objects in each video frame of the transcoded video, so that it can be quickly and accurately determined whether the transcoded video has a frame loss or frame drop problem.

The foregoing illustrates a schematic solution of the video processing device according to this embodiment. It should be noted that the technical solution of the video processing device belongs to the same concept as the technical solution of the above-mentioned video processing method. For details of the technical solution of the video processing device that are not described in detail, reference may be made to the description of the technical solution of the above-mentioned video processing method.

Figure 14:
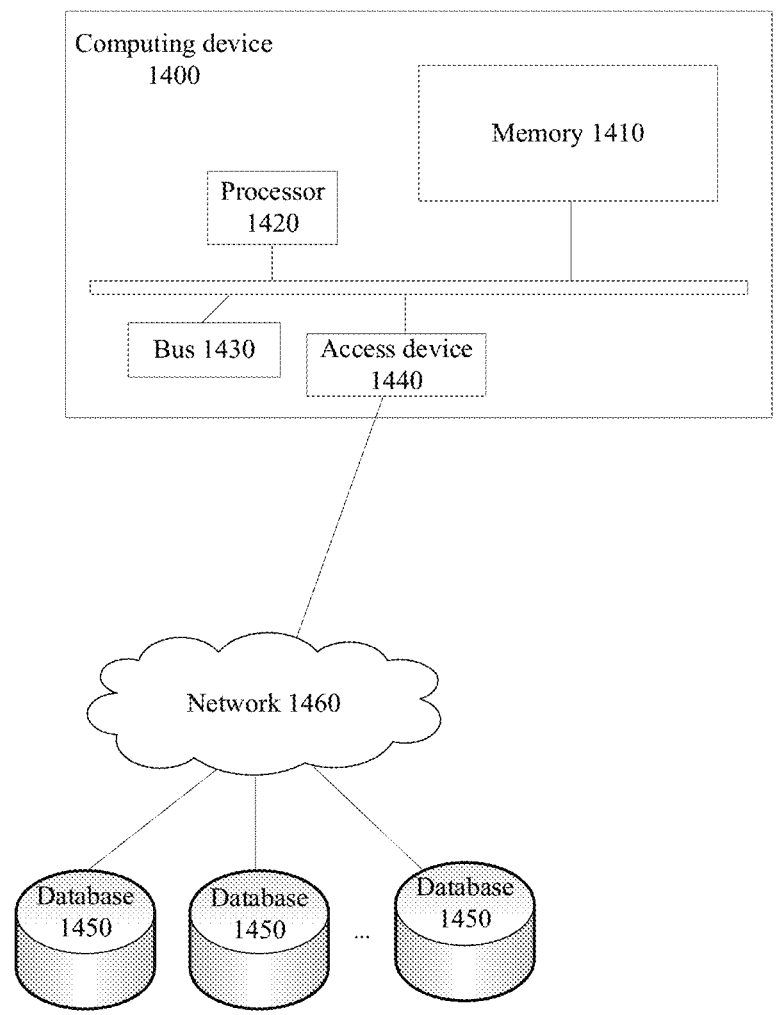
FIG. 14 is a structural block diagram of a computing device according to an embodiment of the present disclosure.

Reference is made to FIG. 14, which shows a structural block diagram of a computing device 1400 according to an embodiment of the present disclosure. Components of the computing device 1400 include but are not limited to a memory 1410 and a processor 1420. The processor 1420 is connected to the memory 1410 via a bus 1430. A database 1450 is used to store data.

The computing device 1400 further includes an access device 1440 that enables the computing device 1400 to communicate via one or more networks 1440. Examples of these networks include a public switched telephone network (PSTN), a local area network (LAN), a wide area network (WAN), a personal area network (PAN), or a combination of communication networks such as the Internet. The access device 1440 may include one or more of any type of wired or wireless network interface (for example, a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In an embodiment of the present disclosure, the above components of the computing device 1400 may also be connected to other components that are not shown in FIG. 14, for example, via the bus. It should be understood that the structural block diagram of the computing device shown in FIG. 14 is only for the purpose of example, and is not intended to limit the scope of the present disclosure. Those skilled in the art can add or replace other components as needed.

The computing device 1400 may be any type of stationary or mobile computing device, including mobile computers or mobile computing devices (for example, a tablet computer, a personal digital assistant, a laptop computer, a notebook computer, a netbook), mobile phones (for example, a smart phone), wearable computing devices (for example, a smart watch, or smart glasses) or other types of mobile devices, or stationary computing devices such as a desktop computer or a PC. The computing device 1400 may also be a mobile or stationary server.

The processor 1420 is configured to execute the following computer-executable instructions. When executing the instructions, the processor 1420 implements the steps of the video processing method.

The foregoing illustrates a schematic solution of the computing device according to this embodiment. It should be noted that the technical solution of the computing device belongs to the same concept as the technical solution of the above-mentioned video processing method. For details of the technical solution of the computing device that are not described in detail, reference may be made to the description of the technical solution of the above-mentioned video processing method.

A computer-readable storage medium is further provided according to an embodiment of the present disclosure. The computer-readable storage medium stores computer instructions that, when executed by a processor, cause the processor to implement the steps of the video processing method described above.

The foregoing illustrates a schematic solution of the computer-readable storage medium according to this embodiment. It should be noted that the technical solution of the storage medium belongs to the same concept as the technical solution of the above-mentioned video processing method. For details of the technical solution of the storage medium that are not described in detail, reference may be made to the description of the technical solution of the above-mentioned video processing method.

The foregoing describes specific embodiments of the present disclosure. Other embodiments are within the scope of the appended claims. In some cases, the actions or steps described in the claims may be performed in a different order from that in the embodiments and still achieve desired results. In addition, the processes depicted in the drawings are not required to be performed in the specific order or sequential order shown to achieve the desired results. In some embodiments, multitasking and parallel processing are also possible or may be advantageous.

The computer instructions include computer program codes. The computer program codes may be in the form of source codes, object codes, executable files, or in some intermediate forms. The computer-readable storage medium may include: any entity or device capable of carrying the computer program codes, a recording medium, a U disk, a mobile hard disk, a magnetic disk, an optical disk, a computer memory, a read-only memory (ROM), a random access memory (RAM), an electrical carrier signal, a telecommunication signal, and a software distribution medium, and the like. It should be noted that the content contained in the computer-readable storage medium can be appropriately added or deleted according to requirements of the legislation and patent practice in the jurisdiction. For example, in some jurisdictions, the computer-readable storage medium does not include the electrical carrier signal and the telecommunication signal, according to the legislation and patent practice.

It should be noted that, the above-mentioned method embodiments are all expressed as a series of combinations of actions for simplicity of description, but those skilled in the art should understand that the present disclosure is not limited by the described sequence of actions. This is because according to the present disclosure, some steps can be performed in other order or performed simultaneously. In addition, those skilled in the art should also understand that the embodiments described in the specification are all preferred embodiments, and the actions and modules involved are not necessarily all required by the specification.

In the above-mentioned embodiments, the description of each embodiment has its own emphasis. For parts that are not described in detail in an embodiment, reference may be made to related descriptions of other embodiments.

The embodiments of the present disclosure disclosed above are only used to help explain the present disclosure, and do not limit the present disclosure. Apparently, many modifications and changes can be made according to the content of the present disclosure. These embodiments are selected and specifically described in the present disclosure in order to better explain the principles and practical applications of the present disclosure, so that those skilled in the art can understand and use the present disclosure well. The present disclosure is only limited by the claims and a full scope and equivalents thereof.

What is claimed is:

1. A method of processing videos, comprising:
   obtaining a video to be transcoded, the video comprising a plurality of frames;
   embedding a test object in each of the plurality of frames of the video to be transcoded, wherein the test object in each of the plurality of frames of the video to be transcoded comprises a video parameter, and wherein the test object is configured to test a transcoding result;
   transcoding the video using a predetermined video transcoding mechanism and obtaining the transcoded video;
   extracting the test object from each of a plurality of frames of the transcoded video; and
   determining an accuracy of the transcoding result based on a first sequence of video parameter comprised in the test object embedded in each of the plurality of frames of the video to be transcoded and a second sequence of video parameter comprised in the test object extracted from each of the plurality of frames of the transcoded video.

2. The method of claim 1, further comprising:
   generating the first sequence based on arranging, frame by frame, the video parameter embedded in each of the plurality of frames of the video to be transcoded;
   generating the second sequence based on arranging, frame by frame, the video parameter extracted from each of the plurality frames of the transcoded video;
   comparing the first sequence with the second sequence; and
   determining that the video has been successfully transcoded in response to determining that the first sequence matches the second sequence.

3. The method of claim 2, wherein the video parameter comprises a video frame serial number, and wherein the method further comprises:
   in response to determining that at least one part of the first sequence does not match at least one part of the second sequence, determining at least one frame corresponding to the at least one unmatched part as a verification video frame; and
   determining that the video has been successfully transcoded in response to determining that the verification video frame meets a predetermined transcoding condition.

4. The method of claim 1, wherein the video parameter comprises a number of audio frames, and wherein the method further comprises:
   acquiring a current number of audio frames that appear before each of the plurality of frames of the transcoded video; and
   determining that the video has been successfully transcoded in response to determining that the current number of audio frames is the same as a number of audio frames contained in the test object extracted from each of the plurality of frames of the transcoded video.

5. The method of claim 1, wherein the video parameter comprises a video frame resolution, and wherein the method further comprises:
   acquiring a current video frame resolution of each of the plurality of frames of the transcoded video;
   in response to determining that the current video frame resolution is different from a video frame resolution contained in the test object extracted from each corresponding frame of the transcoded video, determining at least one frame of the transcoded video having the video frame resolution different from the current video frame resolution as a verification video frame; and determining that the video has been successfully transcoded in response to determining that the verification video frame meets a predetermined transcoding condition.

6. The method of claim 1, wherein the video parameter comprises a video frame color space, and wherein the method further comprises:
acquiring a current video frame color space of each of the plurality of frames of the transcoded video;
in response to determining that the current video frame color space is different from a video frame color space contained in the test object extracted from each corresponding frame of the transcoded video, determining at least one frame of the transcoded video having the video frame color space different from the current video frame color space as a verification video frame; and
determining that the video has been successfully transcoded in response to determining that the verification video frame meets a predetermined transcoding condition.

7. The method of claim 1, wherein the video parameter comprises video frame encapsulation information, and wherein the method further comprises:
acquiring current video frame encapsulation information of each of the plurality of frames of the transcoded video;
in response to determining that the current video frame encapsulation information is different from video frame encapsulation information contained in the test object extracted from each corresponding frame of the transcoded video, determining at least one frame of the transcoded video having the video frame encapsulation information different from the current video frame encapsulation information as a verification video frame; and
determining that the video has been successfully transcoded in response to determining that the verification video frame meets a predetermined transcoding condition.

8. The method of claim 1, further comprising:
setting the quantity of the test object at a predetermined position of each of the plurality of frames of the video to be transcoded; and
recognizing the quantity of the test object in each of the plurality of frames of the transcoded video using a predetermined recognition algorithm.

9. The method of claim 1, wherein the test object comprises a two-dimensional code.

10. A system, comprising:
at least one processor; and
at least one memory communicatively coupled to the at least one processor and comprising computer-readable instructions that upon execution by the at least one processor cause the at least one processor to perform operations comprising:
obtaining a video to be transcoded, the video comprising a plurality of frames;
embedding a test object in each of the plurality of frames of the video to be transcoded, wherein the test object in each of the plurality of frames of the video to be transcoded comprises a video parameter, and wherein the test object is configured to test a transcoding result;
transcoding the video using a predetermined video transcoding mechanism and obtaining the transcoded video;
extracting the test object from each of a plurality of frames of the transcoded video; and
determining an accuracy of the transcoding result based on a first sequence of video parameter comprised in the test object embedded in each of the plurality of frames of the video to be transcoded and a second sequence of video parameter comprised in the test object extracted from each of the plurality of frames of the transcoded video.

11. The system of claim 10, the operations further comprising:
generating the first sequence based on arranging, frame by frame, the video parameter embedded in each of the plurality of frames of the video to be transcoded;
generating the second sequence based on arranging, frame by frame, the video parameter extracted from each of the plurality frames of the transcoded video;
comparing the first sequence with the second sequence; and
determining that the video has been successfully transcoded in response to determining that the first sequence matches the second sequence.

12. The system of claim 11, wherein the video parameter comprises a video frame serial number, and wherein the operations further comprise:
in response to determining that at least one part of the first sequence does not match at least one part of the second sequence, determining at least one frame corresponding to the at least one unmatched part as a verification video frame; and
determining that the video has been successfully transcoded in response to determining that the verification video frame meets a predetermined transcoding condition.

13. The system of claim 10, wherein the video parameter comprises a number of audio frames, and wherein the operations further comprise:
acquiring a current number of audio frames that appear before each of the plurality of frames of the transcoded video; and
determining that the video has been successfully transcoded in response to determining that the current number of audio frames is the same as a number of audio frames contained in the test object extracted from each of the plurality of frames of the transcoded video.

14. The system of claim 10, wherein the video parameter comprises at least one of a video frame resolution, a video frame color space, or video frame encapsulation information.

15. The system of claim 10, wherein the test object comprises a two-dimensional code.

16. A non-transitory computer-readable storage medium, storing computer-readable instructions that upon execution by a processor cause the processor to implement operations comprising:
obtaining a video to be transcoded, the video comprising a plurality of frames;
embedding a test object in each of the plurality of frames of the video to be transcoded, wherein the test object in each of the plurality of frames of the video to be transcoded comprises a video parameter, and wherein the test object is configured to test a transcoding result;
transcoding the video using a predetermined video transcoding mechanism and obtaining the transcoded video;
extracting the test object from each of a plurality of frames of the transcoded video; and determining an accuracy of the transcoding result based on a first sequence of video parameter comprised in the test object embedded in each of the plurality of frames of the video to be transcoded and a second sequence of video parameter comprised in the test object extracted from each of the plurality of frames of the transcoded video.

17. The non-transitory computer-readable storage medium of claim 16, the operations further comprising:
generating the first sequence based on arranging, frame by frame, the video parameter embedded in each of the plurality of frames of the video to be transcoded;
generating the second sequence based on arranging, frame by frame, the video parameter extracted from each of the plurality frames of the transcoded video;
comparing the first sequence with the second sequence; and
determining that the video has been successfully transcoded in response to determining that the first sequence matches the second sequence.

\* \* \* \* \*